United States Patent
Ikebe

(10) Patent No.: US 9,074,955 B2
(45) Date of Patent: Jul. 7, 2015

(54) DETECTION DEVICE, ELECTRONIC APPARATUS, AND ROBOT

(75) Inventor: Tomo Ikebe, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 825 days.

(21) Appl. No.: 13/233,500

(22) Filed: Sep. 15, 2011

(65) Prior Publication Data

US 2012/0072131 A1 Mar. 22, 2012

(30) Foreign Application Priority Data

Sep. 21, 2010 (JP) ................................. 2010-210516

(51) Int. Cl.
*G01L 1/00* (2006.01)
*G01L 5/22* (2006.01)
*G01L 5/16* (2006.01)
*B25J 13/08* (2006.01)

(52) U.S. Cl.
CPC . *G01L 5/226* (2013.01); *G01L 5/16* (2013.01); *B25J 13/084* (2013.01)

(58) Field of Classification Search
CPC ..... G06F 3/0414; G06F 3/016; G06F 3/0481; G06F 3/04886
See application file for complete search history.

(56) References Cited

U.S. PATENT DOCUMENTS

| | | | |
|---|---|---|---|
| 4,323,740 A | 4/1982 | Balash | |
| 4,953,410 A * | 9/1990 | Tabota | 73/862.046 |
| 6,326,539 B1 * | 12/2001 | Mishima | 84/723 |
| 6,710,267 B2 | 3/2004 | Natsuyama et al. | |
| 7,057,875 B2 | 6/2006 | Fujiyama et al. | |
| 7,129,584 B2 | 10/2006 | Lee | |
| 8,707,802 B2 | 4/2014 | Amano et al. | |
| 2004/0160235 A1 | 8/2004 | Okada et al. | |
| 2005/0190152 A1 | 9/2005 | Vaganov | |
| 2007/0040107 A1 | 2/2007 | Mizota et al. | |
| 2010/0134428 A1 | 6/2010 | Oh | |
| 2012/0072131 A1 | 3/2012 | Ikebe | |
| 2012/0096952 A1 | 4/2012 | Amano et al. | |

FOREIGN PATENT DOCUMENTS

| | | |
|---|---|---|
| JP | A-60-135834 | 7/1985 |
| JP | A-07-128163 | 5/1995 |
| JP | A-2007-187502 | 7/2007 |

(Continued)

OTHER PUBLICATIONS

Jul. 17, 2013 Office Action issued in U.S. Appl. No. 13/240,244.

(Continued)

*Primary Examiner* — Elias Desta
(74) *Attorney, Agent, or Firm* — Oliff PLC

(57) ABSTRACT

A detection device includes: a detecting unit having a first substrate on which a plurality of pressure sensors are disposed around a reference point and a second substrate on which is formed an elastic projection whose center of gravity is positioned in a position overlapping with the reference point and that elastically deforms due to an external force in a state in which the tip of the elastic projection makes contact with the first substrate; and a controller that carries out detection operations for detecting the presence/absence of the external force based on pressure values detected by at least one of the plurality of pressure sensors, and controls the next detection operations of the detection unit based on the result of the previous detection.

19 Claims, 16 Drawing Sheets

(56) References Cited

FOREIGN PATENT DOCUMENTS

| | | |
|---|---|---|
| JP | A-2007-518966 | 7/2007 |
| JP | A-2008-164557 | 7/2008 |
| JP | B2-4364146 | 11/2009 |
| WO | WO 2005/029028 A1 | 3/2005 |

OTHER PUBLICATIONS

Jul. 10, 2013 Office Action issued in U.S. Appl. No. 13/188,996.
U.S. Appl. No. 13/240,244 in the name of Amano et al. filed Sep. 22, 2011.
U.S. Appl. No. 13/188,996 in the name of Ikebe filed Jul. 22, 2011.
David J. Hall, Robotic Sensing Devices, Mar. 1984, Department of Electrical Engineering, The Robotics Institute, Carnegie-Mellon University, Pittsburgh, Pennsylvania, 94 pp.
Feb. 21, 2014 Office Action issued in U.S. Appl. No. 13/188,996.
Jul. 30, 2014 Office Action issued in U.S. Appl. No. 13/188,996.
Feb. 9, 2015 Office Action issued in U.S. Appl. No. 13/188,996.

* cited by examiner

DETECTION DEVICE, ELECTRONIC APPARATUS, AND ROBOT

BACKGROUND

1. Technical Field

The present invention relates to detection devices, electronic apparatuses, and robots.

2. Related Art

The detection devices disclosed in JP-A-60-135834 and JP-A-2008-164557 are known as detection devices that detect an external force. The application of such detection devices in tactile sensors for touch panels, robots, and so on is under consideration.

The detection device disclosed in JP-A-60-135834 is configured using a pressure receiving sheet on the rear surface of which cone-shaped protrusions are disposed in an essentially uniform manner, and pressure distributions are detected from the amounts by which the protrusions deform.

The detection device disclosed in JP-A-2008-164557, meanwhile, includes displaceable contactors on its surface, and also includes a plurality of pressure-sensitive elements that detect and output displacements of the contactors at detection points.

With the detection device disclosed in JP-A-60-135834, the amount by which the protrusions deform is computed from images captured by a camera, resulting in a high amount of computations; this leads to a longer time being required for pressure detection. Furthermore, pressure exerted on the measurement surface (rear surface) of the pressure receiving sheet that acts in directions within the surface (that is, a sliding force) cannot be measured.

On the other hand, with the detection device disclosed in JP-A-2008-164557, although pressure exerted on the measurement surface (front surface) that acts in directions within the surface (that is, a sliding force) can be calculated through computations, a long time is required to obtain an output value in the case where there are many detection points for a single contactor.

Accordingly, both the detection devices disclosed in JP-A-60-135834 and JP-A-2008-164557 have a problem in that they cannot achieve both a function for quickly detecting the presence/absence of pressure and a function for detecting the distribution, direction, and intensity of an external pressure with high accuracy.

SUMMARY

It is an advantage of some aspects of the invention to provide a detection device, an electronic apparatus, and a robot capable of quickly detecting the presence/absence of an external pressure and capable of detecting the distribution, direction, and intensity of an external pressure with high precision.

Application Example 1

A detection device according to this Application Example includes: a first substrate on which a plurality of pressure sensors are disposed; a detection unit that detects an applied external pressure using the plurality of pressure sensors; and a controller that carries out detection operations for detecting the presence/absence of the external pressure based on pressure values detected by at least one of the plurality of pressure sensors, and controls the next detection operations of the detection unit based on the result of the previous detection.

According to this detection device, the presence/absence of an external pressure is detected by at least one of the plurality of pressure sensors disposed in the detection unit, and thus the presence/absence of the external pressure can be detected more quickly than with the detection devices disclosed in JP-A-60-135834, JP-A-2008-164557, and so on. Meanwhile, the controller carries out control so that all of the values of the plurality of pressure sensors are detected in the case where it has been determined that an external pressure has been applied to the surface of the first substrate, which makes it possible to accurately detect the distribution and the intensity of the external pressure.

Application Example 2

In the detection device according to the aforementioned Application Example, the plurality of pressure sensors are disposed around a reference point on the first substrate; the detection device further includes a second substrate on which is formed an elastic projection disposed so as to oppose the plurality of pressure sensors on the first substrate and whose tip makes contact with a position on the first substrate that overlaps with the reference point; and the detection unit includes a pressure component separation mechanism configured of the plurality of pressure sensors and the elastic projection.

According to this detection device, the elastic projection in the detection unit can deform in the sliding direction (a direction parallel to the surface of the pressure sensors) while the tip of the elastic projection makes contact with the first substrate (the plurality of pressure sensors), and thus the direction and intensity of the external pressure can be detected.

When an external pressure is applied to the surface of the second substrate in a predetermined direction, the elastic projection is compressed and deforms with its tip making contact with the first substrate. Here, in the case where there is a sliding force component in a predetermined direction along the surface, the elastic projection deforms in an unbalanced manner. In other words, the center of gravity (hereinafter called "center") of the elastic projection shifts from the reference point and moves in a predetermined direction (the sliding direction). Upon doing so, the ratio of pressure sensors that overlap with areas in which the center of the elastic projection has moved becomes relatively greater. In other words, different pressure values are detected by the respective pressure sensors.

Specifically, a relatively large pressure value is detected by pressure sensors in positions that overlap with the center of the elastic projection, whereas a relatively small pressure value is detected by pressure sensors in positions that do not overlap with the center of the elastic projection. Accordingly, the difference between the pressure values detected by the respective pressure sensors can be computed, and the direction and intensity at which the external pressure has been applied can be found based on that difference.

Accordingly, in the case where an external pressure has been detected by at least one of the plurality of pressure sensors, it is possible to find the direction and intensity of the external pressure by the pressure component separation mechanism executing the pressure detection.

Application Example 3

In the detection device according to the aforementioned Application Example, the at least one of the plurality of pressure sensors include the pressure sensors that are disposed in a position that is the closest to the reference point.

According to this detection device, the presence/absence of an external pressure is determined by the pressure sensors that are disposed closest to the reference point, which is the first area where the elastic projection makes contact with the first substrate due to the external pressure, and thus the presence/absence of the external pressure can be determined with favorable sensitivity.

Application Example 4

It is preferable that the detection device according to the aforementioned Application Example further include a computation unit that carries out a first computation process in which the difference between pressure values detected by a arbitrary combination of pressure sensors among the plurality of pressure sensors arising due to the elastic projection of the pressure component separation mechanism elastically deforming is computed, and the direction and intensity of the applied external pressure is computed based on the difference.

Application Example 5

In the detection device according to the aforementioned Application Example, it is preferable that the plurality of pressure sensors be disposed symmetrically, with the reference point serving as the point of symmetry.

According to this detection device, the distances between the reference point and each of the pressure sensors are the same, and thus the relationships between the amount of deformation of the elastic projection and the pressure values detected by the respective pressure sensors are the same.

For example, in the case where a plurality of pressure sensors are disposed at different distances from a reference point, the pressure values detected by the respective pressure sensors will differ from each other even if the amount of deformation of the elastic projection is the same. Accordingly, when computing the difference between detected values, a correction coefficient based on the disposal locations of the pressure sensors is necessary. However, according to this configuration, the relationships between the amount of deformation of the elastic projection and the pressure values detected by the respective pressure sensors are the same, and thus the stated correction coefficient is unnecessary.

Accordingly, it is easier to compute the direction and intensity of the external pressure from the difference between the pressure values detected by the pressure sensors, which makes it possible to detect the external pressure in an efficient manner.

Application Example 6

In the detection device according to the aforementioned Application Example, it is preferable that the plurality of pressure sensors be disposed in matrix form in two directions that are orthogonal to each other.

According to this detection device, it is easy to compute the direction and intensity of the external pressure based on the differences between the pressure values of pressure sensors which are arbitrarily combined, from among the pressure values of the pressure sensors.

Application Example 7

In the detection device according to the aforementioned Application Example, it is preferable that a plurality of elastic projections be formed on the second substrate; and the detection unit include a plurality of pressure component separation mechanisms between the first substrate and the second substrate.

According to this detection device, a distribution of the direction and intensity of an external pressure acting on the detection unit can be detected.

Application Example 8

In the detection device according to the aforementioned Application Example, the computation unit carries out a second computation process that computes the direction and intensity of the resultant force of the external pressures applied to the second substrate using the result of the first computation process.

According to this detection device, the direction and intensity of the total of the external pressures applied to the second substrate of the detection device can be found.

Application Example 9

In the detection device according to the aforementioned Application Example, the computation unit carries out a third computation process that computes the direction and intensity of rotational torque applied to the second substrate due to the external pressure using the result of the first computation process.

According to this detection device, the direction and intensity of the rotational torque of the external pressure applied to the second substrate of the detection device can be found.

Application Example 10

In the detection device according to the aforementioned Application Example, a reinforcing member that is more rigid than the second substrate is disposed on the opposite side of the second substrate to the side on which the elastic projections are formed.

According to this detection device, it is possible to suppress the two adjacent elastic projections from being compressed and deforming in directions opposite to each other, as compared to the case where the reinforcing member is not provided. In other words, it is possible to suppress mistaken detections in which the direction opposite to the direction of the external pressure is detected. Accordingly, it is possible to detect the direction of the external pressure with high precision.

Application Example 11

An electronic apparatus according to this Application Example includes the detection device described above.

According to this electronic apparatus, the aforementioned detection device is provided, and it is thus possible to provide an electronic apparatus capable of detecting the presence/absence of an external pressure quickly, and capable of detecting the direction and intensity of the external pressure with high precision.

Application Example 12

A robot according to this Application Example includes the detection device described above.

According to this robot, the aforementioned detection device is provided, and it is thus possible to provide a robot capable of detecting the presence/absence of an external pressure quickly, and capable of detecting the direction and intensity of the external pressure with high precision.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
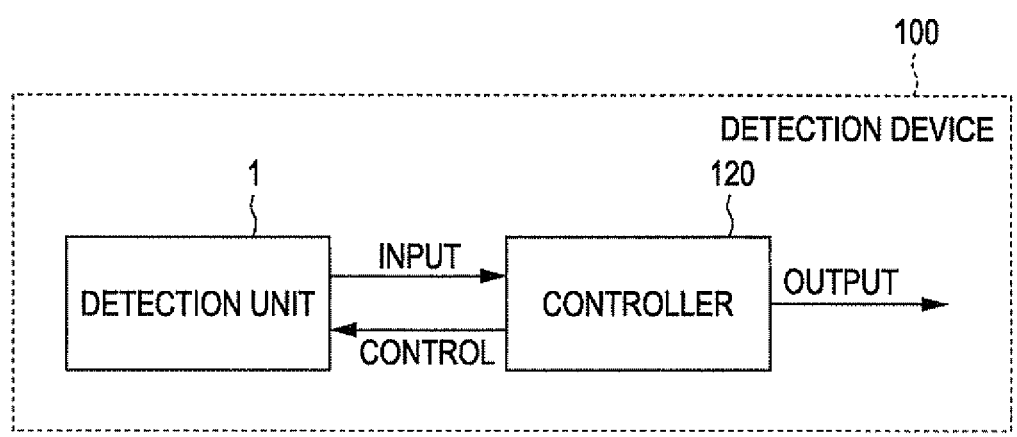
FIG. 1 is a schematic diagram illustrating the overall configuration of a detection device according to a first embodiment.

Hereinafter, embodiments of the invention will be described with reference to the drawings. The embodiments illustrate only several aspects of the invention, and are not intended to limit the invention in any way; many variations can be made on the invention without departing from the scope of the technical spirit of the invention. Furthermore, to facilitate understanding of the various configurations, the scale, numbers, and so on of the various structures depicted in the drawings differ from those of the actual structures.

In the following descriptions, it is assumed that the XYZ orthogonal coordinate system indicated in the drawings is employed, and the various members will be described with reference to this XYZ orthogonal coordinate system. Note that with the XYZ orthogonal coordinate system shown in the drawings, the X and Y axes are set to the directions in which the front and rear surfaces of a first substrate 10 are formed, whereas the Z axis is set to the normal direction that is orthogonal to the front and rear surfaces of the first substrate 10 (that is, the thickness direction of the first substrate 10).

First Embodiment

Detection Device

FIG. 1 is a block diagram illustrating the electrical configuration of a detection device 100 according to the first embodiment of the invention.

The detection device 100 according to this embodiment includes a detection unit 1 and a controller 120.

The detection unit 1 detects an external pressure that has been applied to a plurality of pressure sensors, and inputs the detected pressure into the controller 120.

The controller 120 carries out detection operations for detecting the presence/absence of the external pressure based on pressure values detected by at least one of the pressure sensors, and controls the next detection operations of the detection unit 1 based on the result of the previous detection.

The detection device 100 is a pressure sensor-type touch-pad capable of detecting the direction and intensity of an external pressure, and is used, for example, as a pointing device in an electronic apparatus such as a portable personal computer (a laptop computer) instead of a mouse.

Figure 2:
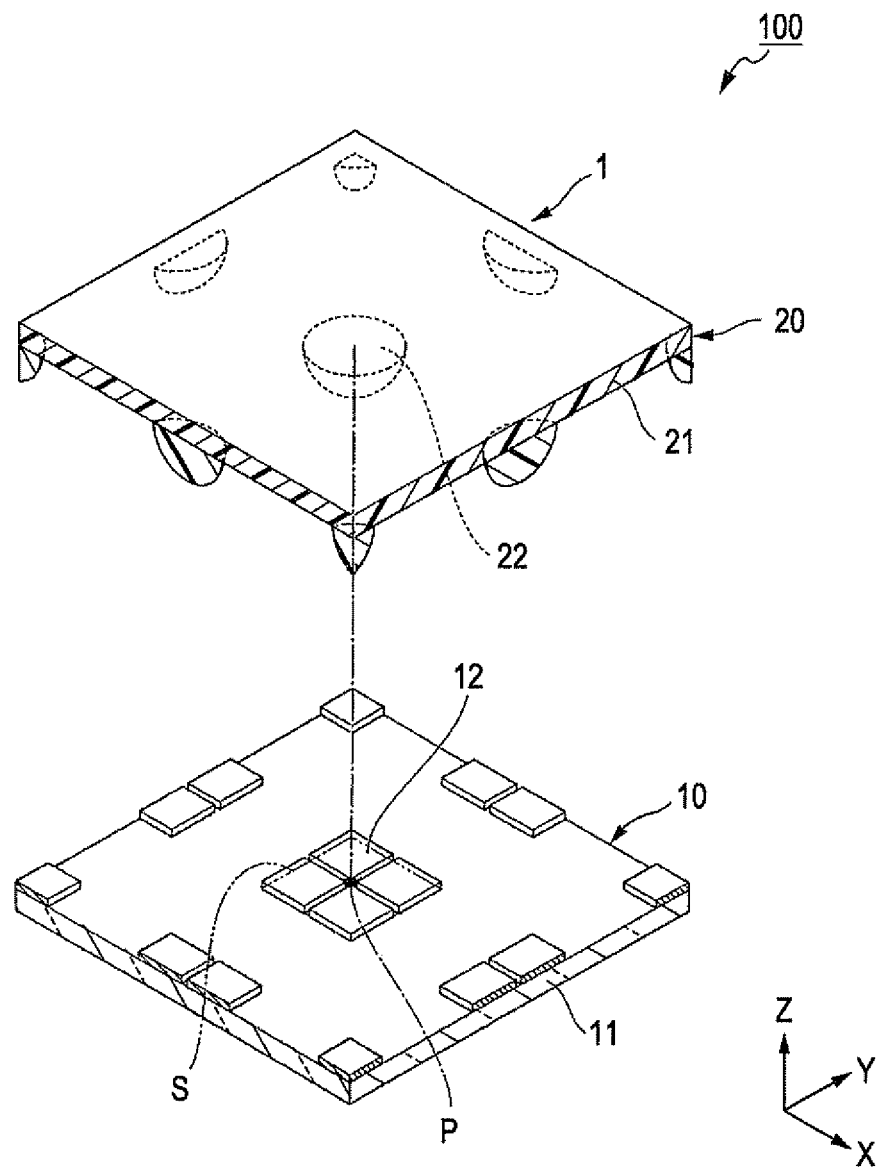
FIG. 2 is an exploded perspective view illustrating the overall configuration of a detection unit according to the first embodiment.

FIG. 2 is an overall exploded perspective view illustrating the configuration of the detection unit 1 in the detection device 100.

Here, the X axis is parallel to one of the two sides that intersect with each other on the front and rear surfaces of the first substrate 10, and the Y axis is parallel to the other of the two sides. The Z axis, meanwhile, corresponds to the normal direction that is orthogonal to the front and rear surfaces of the first substrate 10.

As shown in FIG. 2, the detection unit 1 includes the first substrate 10, serving as a first substrate, and a second substrate 20, serving as a second substrate.

The first substrate 10 includes pressure sensors 12 that are disposed in a plurality of around a reference point P.

On the second substrate 20, meanwhile, an elastic projection 22 is formed with its center positioned above the position of a corresponding reference point P, the tips of the elastic projections 22 making contact with the first substrate 10 and elastically deforming due to an external pressure.

In this embodiment, a total of four pressure sensors 12 are disposed around a single reference point P, with two each disposed in the X axis direction and the Y axis direction, in correspondence with a single elastic projection 22; this region is referred to as a unit detection region S. A pressure component separation mechanism is configured from the plurality of (four) pressure sensors 12 and the elastic projection 22 disposed opposite to the plurality of (four) pressure sensors 12 in the unit detection region S.

Note that "reference point" refers to a point within the plane in which the center of the elastic projection is located in the case where a sliding force is not acting.

The first substrate 10 is configured so as to include a rectangular plate-shaped first main substrate portion 11 configured of a material such as glass, quartz, or plastic and the plurality of pressure sensors 12 disposed on the first main substrate portion 11. The size of the first main substrate portion 11 (when viewed from above) is, for example, approximately 56 mm in the depth direction and 56 mm in the width direction.

The plurality of pressure sensors 12 are disposed symmetrically using the reference point P as the point of symmetry. For example, the plurality of pressure sensors 12 are disposed in matrix form in two directions that are orthogonal to each other (the X direction and the Y direction). Accordingly, the distances between the reference point P and each of the pressure sensors 12 are the same, and thus the relationships between the deformation of the elastic projection 22 and the pressure values detected by the respective pressure sensors 12 are the same. It is thus easy to calculate the difference between the pressure values detected by arbitrary combinations of the pressure sensors 12 from among the pressure values detected by the pressure sensors 12. Note that a method for calculating the difference between pressure values will be described later.

A total of four pressure sensors 12, or two rows in the depth direction and two columns in the width direction, are disposed per unit detection region S. The center of the four pressure sensors 12 (that is, the center of the unit detection region S) corresponds to the reference point P. The size of the unit detection region S (when viewed from above) is, for example, approximately 2.8 mm in the depth direction and 2.8 mm in the width direction. Furthermore, the surface area of each of the four pressure sensors 12 is approximately the same. A pressure-sensitive element such as pressure-sensitive conductive rubber can be used for each pressure sensor 12. The pressure sensors 12 convert pressure applied to the pressure-sensitive conductive rubber when an external pressure is acting on a contact surface into an electric signal.

The second substrate 20 is configured so as to include a rectangular plate-shaped second main substrate portion 21 and the plurality of elastic projections 22 disposed on the second main substrate portion 21. The second main substrate portion 21 is a portion that directly receives external pressures. The second main substrate portion 21 can be configured from a material such as glass, quartz, or plastic, or can be configured from a resinous material such as a urethane foam resin, a silicone resin, or the like. In this embodiment, a resinous material is used as the material for forming the second main substrate portion 21 and the elastic projections 22, and the second main substrate portion 21 and the elastic projections 22 are formed as a single integral unit using a metal mold; however, these elements may be formed individually.

Although the aforementioned descriptions describe the elastic projection 22 formed in the central area of the planar surface of the second main substrate portion 21, it should be noted that a plurality of multiple elastic projections to which reference numerals have not been added are formed on the second main substrate portion 21. The plurality of elastic projections are disposed in matrix form along the X direction and the Y direction on the second main substrate portion 21, thus configuring a plurality of pressure component separation mechanisms. The tips of the plurality of elastic projections, including the elastic projection 22, are cone-shaped spherical surfaces, and make contact with a plurality of pressure sensors, including the pressure sensors 12, disposed upon the first main substrate portion 10. The elastic projections 22 are disposed in positions where the centers thereof initially overlap with the reference point P.

The size of the elastic projection 22 can be set as desired. In this embodiment, the diameter of the area of the elastic projection 22 that makes contact with the first substrate 10 is approximately 1.8 mm. Meanwhile, the length of the elastic projection 22 in the Z direction is approximately 2 mm. The gap between adjacent elastic projections 22 is approximately 1 mm. Finally, the durometer hardness of the elastic projection 22 (that is, a stiffness value measured by a type A, ISO 7619-compliant durometer) is approximately 30.

Figure 3:
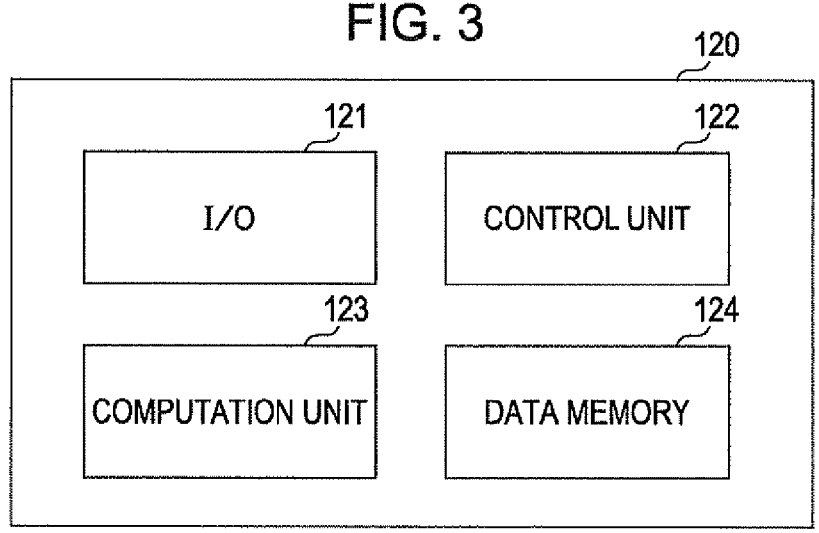
FIG. 3 is a schematic diagram illustrating the overall configuration of a controller according to the first embodiment.

FIG. 3 is a block diagram illustrating the configuration of the controller 120 in the detection device 100. The controller 120 is configured of an interface unit (I/O unit) 121 that sends/receives signals to/from the detection unit 1 and outputs computation results, a control unit 122 that carries out control processes for the pressure sensors 12, a computation unit 123 that carries out various computation processes, and a data memory 124 that stores data.

The computation unit 123 carries out a first computation process, computing the difference between the pressure values detected by a arbitrary combination of pressure sensors 12 from among the pressure values detected by the plurality of pressure sensors 12 when the elastic projection 22 has elastically deformed due to an external pressure, and computing the direction and intensity of the external pressure based on that difference.

In addition, the computation unit 123 carries out a second computation process, computing the direction and the intensity of the resultant force of the pressures detected by the detection unit 1, and a third computation process, computing the direction and intensity of the rotational torque acting on the detection unit 1 due to the external pressure. Details of these computation methods will be given later.

Although in this embodiment, both the control unit 122 and the computation unit 123 include CPUs, it should be noted that a configuration in which the control of the device carried out by the control unit 122 and the various types of computations carried out by the computation unit 123 are performed by a single CPU may be employed. To rephrase, the control unit 122 may include a CPU and the CPU may handle a variety of types of computations.

Figure 4:
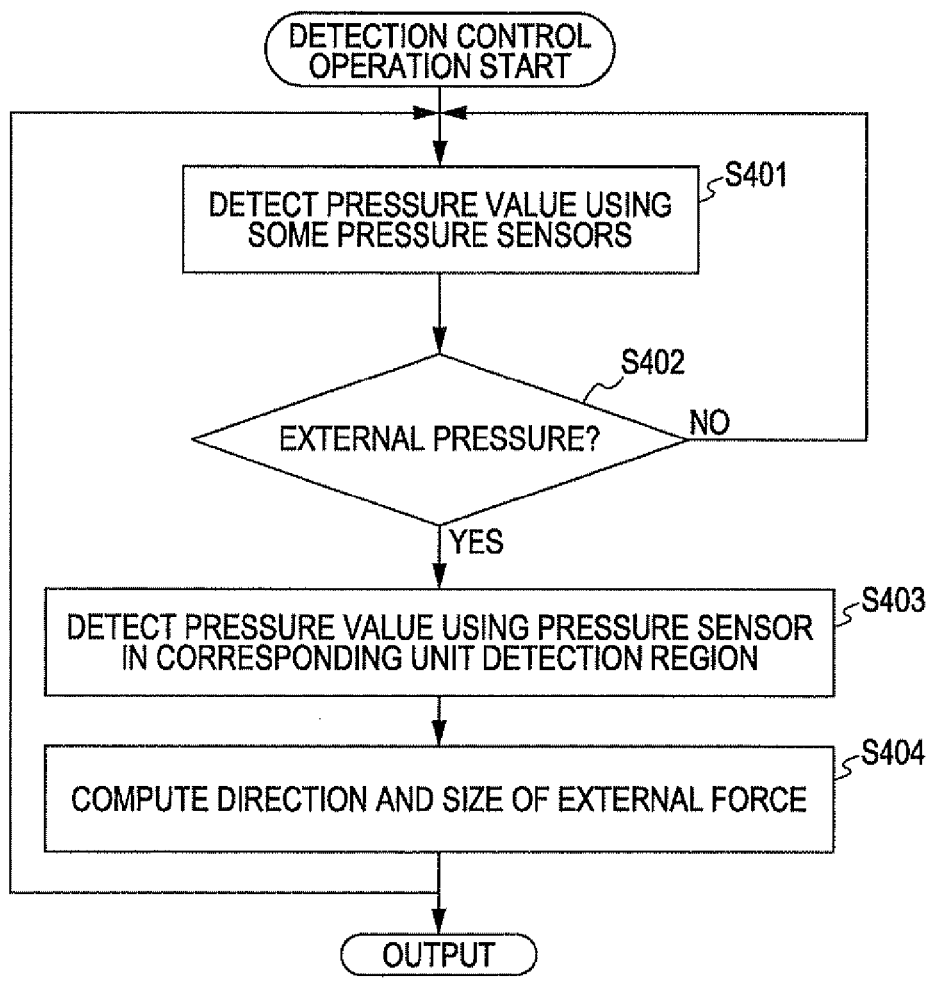
FIG. 4 is a flowchart illustrating control operations performed by the detection device according to the first embodiment.

FIG. 4 is a flowchart illustrating detection control operations performed by the detection device 100.

First, the controller 120 detects pressure values from a arbitrary number of pressure sensors 12 that are closest to the reference point P, from among the pressure sensors 12 in the unit detection region S (step S401).

Next, the presence/absence of an external pressure is determined from the detected pressure values (that is, detection operations are carried out) (step S402).

The next detection operations for the pressure sensors 12 in the corresponding unit detection region S are determined based on the result of the stated determination, and are then executed.

In the case where it has been determined in step S402 that there is no external pressure, the process returns to step S401, where the detection operations, in which pressure values of a arbitrary number of pressure sensors 12 that are closest to the reference point P are detected (step S401) and the presence/absence of an external pressure is quickly determined from the detected pressure values (step S402), are repeated.

However, in the case where it has been determined in step S402 that there is an external pressure, the pressure values of the plurality of pressure sensors 12 disposed in the pressure component separation mechanism within the unit detection region S are detected (step S403).

Next, the direction and intensity of the external pressure is computed (step S404).

At the same time that the series of computations ends and the results thereof are outputted, the process returns to step S401, where the detection operations that detect pressure values by the pressure sensors 12 and detect the presence/absence of an external pressure are carried out.

FIGS. 5A through 5C and 6A through 6C are descriptive diagrams illustrating the method of the first computation process that detects the direction of an external pressure acting on the reference point P in the unit detection region S.

Figure 5A:
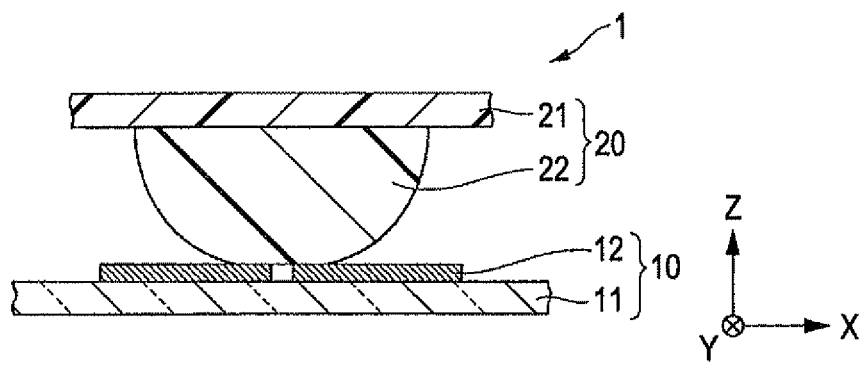
FIGS. 5A through 5C are cross-sectional views illustrating changes in a pressure component separation mechanism within a unit detection region of the detection unit according to the first embodiment.
Figure 5B:
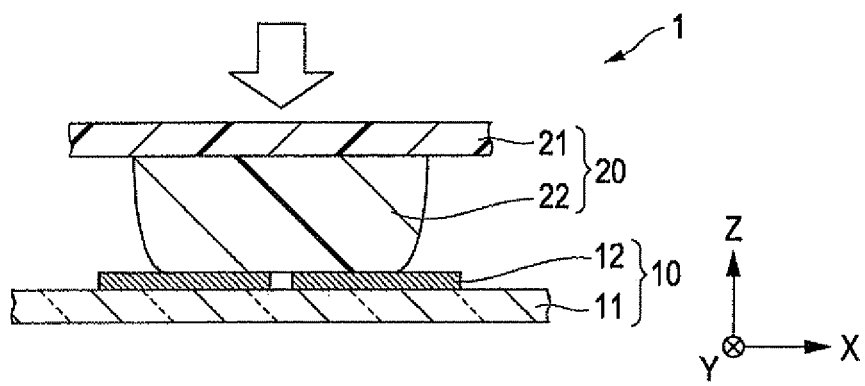
Figure 5C:
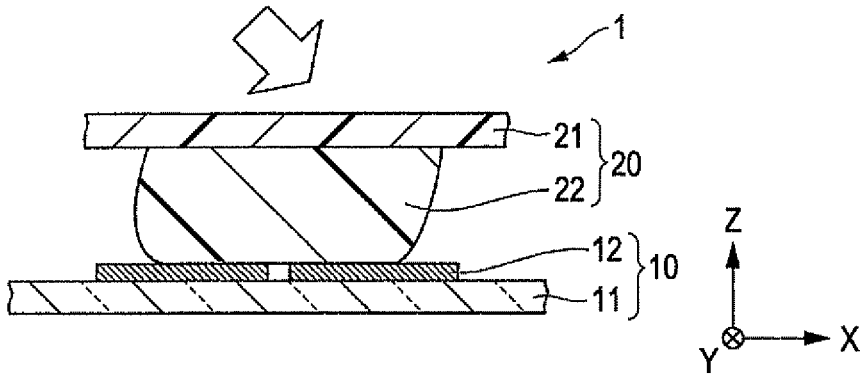
Figure 6A:
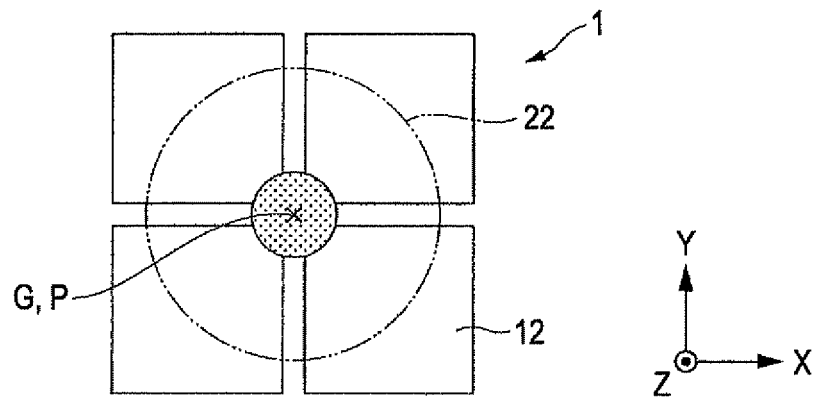
FIGS. 6A through 6C are plan views illustrating changes in the pressure component separation mechanism in a unit detection region of the detection unit according to the first embodiment.
Figure 6B:
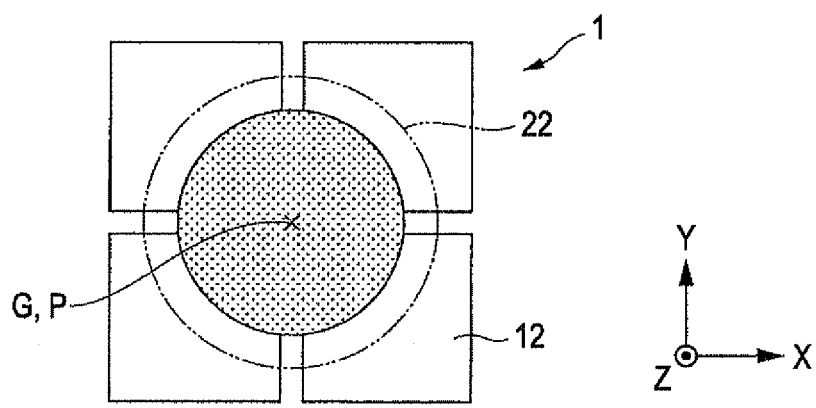
Figure 6C:
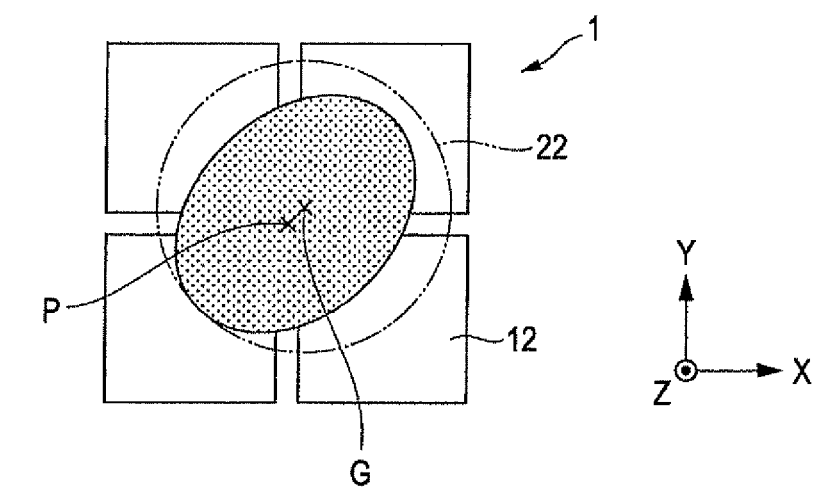

FIGS. 5A through 5C are cross-sectional views illustrating changes in the pressure component separation mechanism in the unit detection region S according to the first embodiment. FIGS. 6A through 6C, meanwhile, are plan views, respectively corresponding to FIGS. 5A through 5C, illustrating changes in the pressure component separation mechanism in the unit detection region S according to the first embodiment.

Note that the "surface" of the first substrate 10 refers to the surface on which the pressure sensors 12 are formed, and the "surface" of the second substrate 20 refers to the surface that receives the external pressure, which is the rear surface of the surface on which the elastic projection 22 is formed. FIG. 5A and FIG. 6A illustrate a state prior to an external pressure being applied to the surface of the second substrate 20 (that is, a state where there is no external pressure acting). FIG. 5B and FIG. 6B, meanwhile, illustrate a state in which an external pressure in the vertical direction (in a state in which there is no sliding force) is applied to the surface of the second substrate 20. FIG. 5C and FIG. 6C illustrate a state in which an external pressure in a diagonal direction (in a state in which there is a sliding force) is applied to the surface of the second substrate 20. Meanwhile, in FIGS. 6A to 6C, the reference symbol G indicates the center (pressure center) of the elastic projection 22.

As shown in FIG. 5A and FIG. 6A, the elastic projection 22 does not deform before an external pressure is applied to the surface of the second substrate 20. Accordingly, the distance between the first substrate 10 and the second substrate 20 is kept constant. At this time, the elastic projection 22 is disposed in a position where the center G thereof overlaps with the reference point P. The pressure values of the respective pressure sensors 112 at this time are stored in the data memory 124. The direction and intensity of an acting external pressure are found using the pressure values of the pressure sensors 112 stored in the data memory 124 as a reference.

As shown in FIG. 5B and FIG. 6B, when an external pressure in the vertical direction is applied to the surface of the second substrate 20, the elastic projection 22 is compressed and deforms in the Z direction in a state in which the tip of the elastic projection 22 makes contact with the plurality of pressure sensors 12 disposed on the surface of the first substrate 10. Accordingly, the second substrate 20 bends in the −Z direction, and the distance between the first substrate 10 and the second substrate 20 decreases compared to when the external pressure is not acting. The pressure values of the pressure sensors 12 at this time are greater compared to when the external pressure is not acting. Furthermore, the amount of change thereof is approximately the same value for each of the pressure sensors 12.

As shown in FIG. 5C and FIG. 6C, when an external pressure in a diagonal direction is applied to the surface of the second substrate 20, the elastic projection 22 is compressed and deforms in a tilted manner, in a state in which the tip of the elastic projection 22 makes contact with the plurality of pressure sensors 12 disposed on the surface of the first substrate 10. Accordingly, the second substrate 20 bends in the −Z direction, and the distance between the first substrate 10 and the second substrate 20 decreases compared to when the external pressure is not acting. At this time, the center G of the elastic projection 22 shifts in the +X direction and the +Y direction from the reference point P. In this case, the tip of the elastic projection 22 overlaps with different amounts of surface area in each of the four pressure sensors 12. With respect to the surface area in each of the four pressure sensors 12 that the tip of the elastic projection 22 overlaps with, specifically, the elastic projection 22 overlaps with more of the surface area of the pressure sensors disposed in the +X direction and the +Y direction than the surface area of the pressure sensors disposed in the −X direction and the −Y direction.

The elastic projection 22 deforms in an unbalanced manner due to an external pressure in a diagonal direction. In other words, the center G of the elastic projection 22 shifts from the reference point P and moves in a sliding direction (the X direction and the Y direction). As a result, different pressure values are detected by the respective pressure sensors 12. Specifically, a relatively large pressure value is detected by pressure sensors 12 in positions that overlap with the center G of the elastic projection 22, whereas a relatively small pressure value is detected by pressure sensors 12 in positions that do not overlap with the center G of the elastic projection 22. The direction and intensity at which the external pressure was applied are found based on a difference computation method that will be described later.

Figure 7:
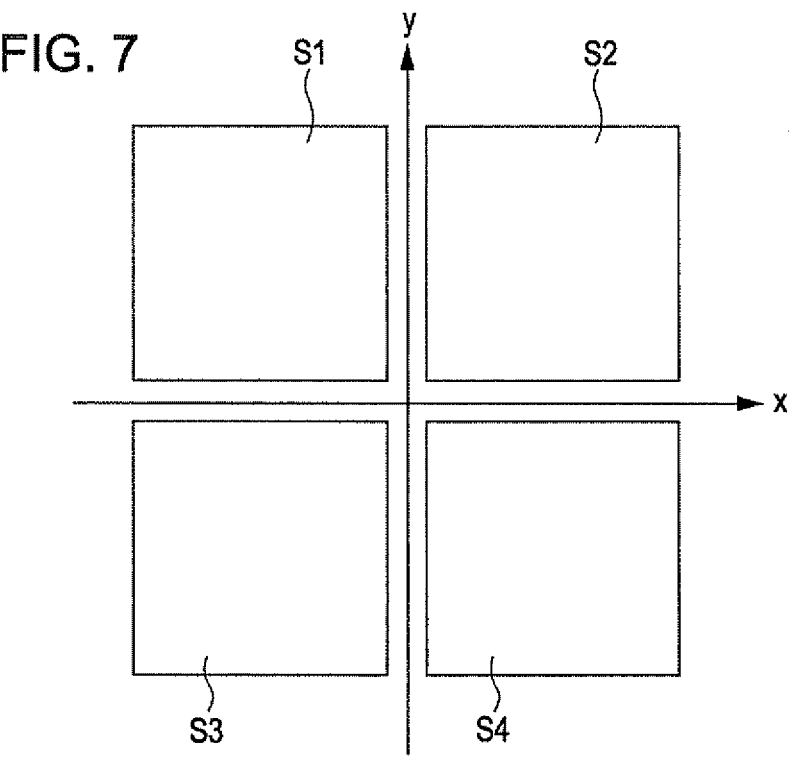
FIG. 7 is a diagram illustrating a coordinate system in a unit detection region of a detection unit according to the first embodiment.
Figure 8:
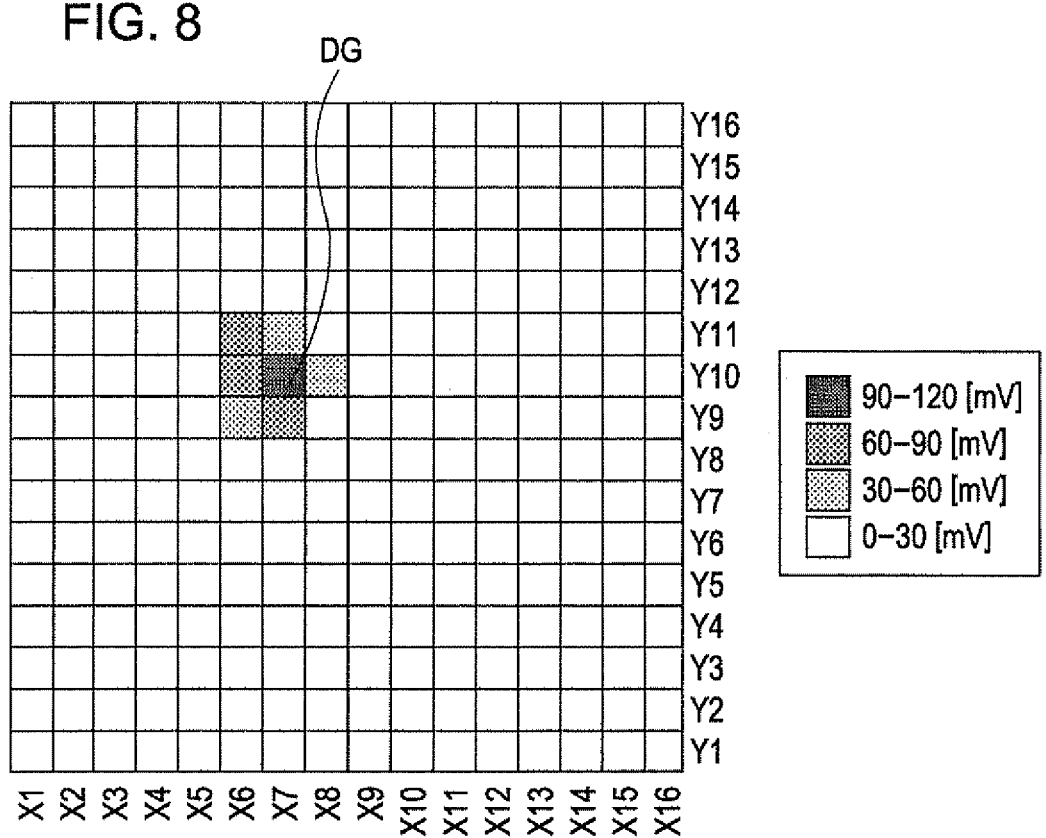
FIG. 8 is a diagram illustrating a pressure distribution in the vertical direction taken by pressure sensors according to the first embodiment.
Figure 9:
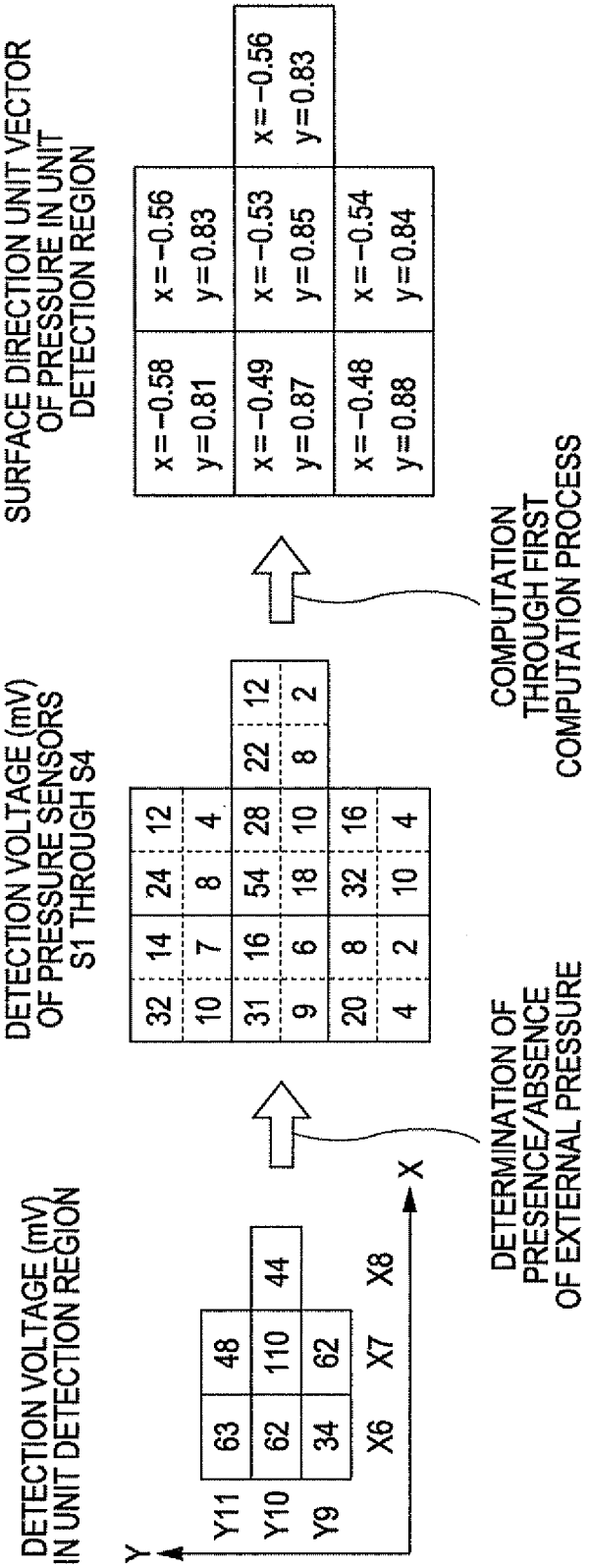
FIG. 9 is a diagram illustrating an example of calculating a sliding direction by pressure sensors according to the first embodiment.

FIG. 7 is a diagram illustrating a coordinate system in a unit detection region S according to the first embodiment. FIG. 8, meanwhile, is a diagram illustrating a pressure distribution in the vertical direction taken by the pressure sensors according to the first embodiment. FIG. 9 is a diagram illustrating an example of calculating a sliding direction by the pressure sensors according to the first embodiment.

As shown in FIG. 7, a total of four pressure sensors S1 through S4 are disposed per unit detection region S, with two rows in the depth direction and two columns in the width direction within the unit detection region S. Here, assuming that the pressure values detected by the pressure sensors S1 through S4 (that is, detected values) are $P_{S1}$, $P_{S2}$, $P_{S3}$, and $P_{S4}$, respectively, an X direction component $F_x$ of the external force that acts in the unit detection region S (that is, the rating amount of the directional component of the external force within the plane that acts in the X direction) is expressed by the following Formula (1).

$$F_x = \frac{(P_{S2} + P_{S4}) - (P_{S1} + P_{S3})}{P_{S1} + P_{S2} + P_{S3} + P_{S4}} \tag{1}$$

Furthermore, a Y direction component $F_y$ of the external force that acts in the unit detection region S (that is, the rating amount of the directional component of the external force within the plane that acts in the Y direction) is expressed by the following Formula (2).

$$F_y = \frac{(P_{S1} + P_{S2}) - (P_{S3} + P_{S4})}{P_{S1} + P_{S2} + P_{S3} + P_{S4}} \qquad (2)$$

Finally, a Z direction component $F_z$ of the external force that acts in the unit detection region S (that is, the vertical direction component of the external force; the Z axis is not shown in FIG. 7) is expressed by the following Formula (3).

$$Fz = P_{S1} + P_{S2} + P_{S3} + P_{S4} \qquad (3)$$

In this embodiment, the difference between the pressure values detected by pressure sensors which are arbitrarily combined from among the pressure values detected by the four pressure sensors S1 through S4 when the elastic projection 22 experiences elastic deformation due to the external pressure is computed, and the direction of the external pressure is computed based on that difference.

As shown in Formula (1), for the X direction component $F_x$ of the external pressure, of the pressure values detected by the four pressure sensors S1 through S4, the values detected by the pressure sensors S2 and S4 disposed in the +X direction are combined, and the values detected by the pressure sensors S1 and S3 disposed in the −X direction are combined. In this manner, the X direction component of the external pressure is found based on the difference between the pressure values in the combination of the pressure sensors S2 and S4 disposed in the +X direction and the pressure values in the combination of the pressure sensors S1 and S3 disposed in the −X direction.

As shown in Formula (2), for the Y direction component $F_y$ of the external pressure, of the pressure values detected by the four pressure sensors S1 through S4, the values detected by the pressure sensors S1 and S2 disposed in the +Y direction are combined, and the values detected by the pressure sensors S3 and S4 disposed in the −Y direction are combined. In this manner, the Y direction component of the external pressure is found based on the difference between the pressure values in the combination of the pressure sensors S1 and S2 disposed in the +Y direction and the pressure values in the combination of the pressure sensors S3 and S4 disposed in the −Y direction.

As shown in Formula (3), for the Z direction component $F_z$ of the external pressure, the resultant force is found by adding together the pressure values of the four pressure sensors S1 through S4. However, a greater detected value tends to be detected for the Z direction component $F_z$ of the external pressure than for the X direction component $F_x$ of the external pressure and the Y direction component $F_y$ of the external pressure (component forces). For example, the detection sensitivity for the Z direction component $F_z$ of the external pressure will increase if a stiff material is used for the elastic projection 22, the tip of the elastic projection 22 has a sharp shape, and so on. However, using a stiff material for the elastic projection 22 makes it difficult for the elastic projection 22 to deform and thus reduces the detected value in the external pressure within the plane. In addition, if the tip of the elastic projection 22 has a sharp shape, there are cases where (abnormally) strong tactile feedback will occur when the contact surface is touched with a finger. Accordingly, it is necessary to correct the detected values as appropriate using a correction coefficient determined based on the material, shape, and so on of the elastic projection 22 in order to align the detected value of the Z direction component $F_z$ of the external pressure with the detected values of the X direction component $F_x$ and the Y direction component $F_y$ of the external pressure.

The direction and intensity of the total of the external pressures acting on the detection unit 1 are obtained by totaling the external pressures acting in the respective unit detection regions S as obtained through the first computation process. Accordingly, the second computation process, which computes the direction and intensity of the total of the external pressures, is a computation that calculates the total of the external pressures obtained in the respective unit detection regions S obtained through the first computation process.

Meanwhile, the direction and intensity of rotational torque that acts on the detection unit 1 is obtained by calculating the center of the distribution of the external pressure that acts on the surface of the second substrate 20 and finding the difference between the X direction components or the Y direction components of the external pressures acting on arbitrary unit detection regions S that are symmetrical central to the coordinates of the center of the distribution. Accordingly, the third computation process that computes the direction and intensity of the rotational torque is a computation of the difference between the X direction components or the Y direction components of the external force acting on arbitrary unit detection regions S that are symmetrical central to the coordinates of the center of the distribution of the external pressure.

FIG. 8 is a diagram illustrating a pressure distribution in the vertical direction taken by pressure sensors.

A case will now be considered in which a location to the upper-left of the center portion of the detection surface of the detection unit 1 is pushed diagonally with a finger, as shown in FIG. 8. In the detection surface of the detection unit 1, unit detection regions S (that is, regions in each of which a total of four pressure sensors, or the pressure sensors S1 through S4, are disposed, with two rows in the depth direction and two columns in the width direction) are disposed in matrix form (resulting in, for example, a total of 256 unit detection regions S, with 16 rows in the depth direction and 16 columns in the width direction). The reference symbol DG indicates the center of the distribution of the detected external pressures.

Because the output voltage of the pressure sensors 12 in regions that are not being pressed by a finger is approximately 0 to 30 mV, an output voltage of 30 mV for the pressure sensors 12 may be set as the basis for determining the presence/absence of an external pressure. In other words, if the total output voltage of the pressure sensors S1 through S4 in the unit detection region S is less than 30 mV, it is determined that an external pressure is not being applied, whereas if the output voltage of the pressure sensors S1 through S4 is greater than or equal to 30 mV, it is determined that an external pressure is being applied.

In the case of FIG. 8, it is determined that of the unit detection regions S disposed with 16 rows in the depth direction and 16 columns in the width direction, an external pressure is acting in seven of the unit detection regions S. The pressure value of the external pressure in the vertical direction is greatest in the center portion of the range in which the external pressure is acting (the total output voltage of the pressure sensors in the unit detection region S is approximately 90 to 120 mV). The pressure value of the external pressure in the vertical direction is lower in the peripheral region following the center portion (approximately 60 to 90 mV), and is lower still in the outermost area (approximately 30 to 60 mV).

A method for calculating the directional components of the external pressure within the surface (that is, the sliding direction) in the case where a location to the upper-left of the center portion of the detection surface of the detection unit 1 is pushed diagonally with a finger, as shown in FIG. 9, will now be considered. In the case of FIG. 8, it is determined that of the unit detection regions S disposed with 16 rows in the depth direction and 16 columns in the width direction, the pressing force of the finger (that is, an external force, or the external pressure) is acting in seven of the unit detection regions S. Accordingly, the computation process is accelerated by extracting only the seven unit detection regions S and computing the directional components of the external pressure within the surface (that is, the sliding direction) through the first computation process.

The seven extracted unit detection regions S each have the four pressure sensors S1 through S4, and the difference between the pressure values detected by pressure sensors which are arbitrarily combined from among the pressure values detected by the pressure sensors S1 through S4 is computed; the direction in which the external pressure is acting is computed based on that difference. In other words, in each unit detection region S, the X direction component $F_x$ of the external pressure and the Y direction component $F_y$ of the external pressure are calculated for each unit detection region S through the first computation process, based on the aforementioned Formula (1) and Formula (2).

The direction and intensity of the total of the external pressures are calculated through the second computation process. Here, because the external pressure has an X direction directional component of −0.54 and a Y direction directional component of 0.845, it can be seen that, if the +X direction is taken as a reference, the total external pressure is acting in the direction that is approximately 122° in the counterclockwise direction.

The direction and intensity of the rotational torque are calculated through the third computation process. In the case of FIG. 8, the coordinates of the center DG of the external pressure distribution are X=6.73 and Y=10.04, and thus the unit detection region S located at X=7 and Y=10 is approximated therefrom. Accordingly, the size of the rotational torque is calculated from the difference between the X axis direction components for a combination of two unit detection regions S that are in a symmetrical relationship central to X=7 and Y=10. Because the intensity of the difference is 8 mV, it can be seen that an extremely small rotational torque is acting on the detection surface of the detection unit 1 in the right-hand screw direction.

With the detection device 100 according to this embodiment, the computation processes can be accelerated more than with the detection devices according to JP-A-60-135834 and JP-A-2008-164557 by extracting only the unit detection regions S on which an external pressure has been applied and computing the components of the external pressure within the surface (that is, the sliding direction).

According to this configuration, the tip of the elastic projection 22 deforms in the sliding direction (a direction parallel to the surface of the pressure sensors 12) while making contact with the first substrate 10 (the plurality of pressure sensors 12), and thus the precision with which the direction and intensity of the external pressure are detected can be increased. When an external pressure is applied to the surface of the second substrate 20 in a predetermined direction, the elastic projection 22 is compressed and deforms in a state in which the tip of the elastic projection 22 makes contact with the plurality of pressure sensors 12 disposed on the first substrate 10. At this time, an imbalance occurs in the deformation of the elastic projection 22. In other words, the center G of the elastic projection 22 shifts from the reference point P and moves in a predetermined direction (the sliding direction). Upon doing so, the ratio of the plurality of pressure sensors 12 that overlap with areas in which the center G of the elastic projection 22 has moved becomes relatively greater. In other words, different pressure values are detected by the respective pressure sensors S1 through S4. Specifically, a relatively large pressure value is detected by pressure sensors 12 in positions that overlap with the center G of the elastic projection 22, whereas a relatively small pressure value is detected by pressure sensors 12 in positions that do not overlap with the center G of the elastic projection 22. Accordingly, through the first computation process, the difference between the pressure values detected by the respective pressure sensors S1 through S4 can be computed and the direction and intensity of the external pressure can be found based on that difference. It is therefore possible to provide the detection device 100, which is capable of detecting the direction and intensity of an external pressure with high precision.

According to this configuration, the plurality of pressure sensors 12 are disposed symmetrically with the reference point P serving as the point of symmetry, and thus the distances between the reference point P and each of the pressure sensors 12 are the same. Accordingly, the pressure values detected by the pressure sensors S1 through S4 are the same as one another. For example, in the case where the plurality of pressure sensors 12 are disposed at different distances from the reference point P, the pressure values detected by the respective pressure sensors 12 will differ from each other. Accordingly, when computing the difference between detected values, a correction coefficient based on the disposal locations of the pressure sensors S1 through S4 is necessary. However, according to this configuration, the pressure values detected by the pressure sensors S1 through S4 are the same, and thus the aforementioned correction coefficient is unnecessary. Accordingly, it is easier to compute the differences between the pressure values of the pressure sensors S1 through S4, which makes it possible to detect the external pressure in an efficient manner.

Furthermore, according to this configuration, the plurality of pressure sensors 12 are arranged in matrix form in two directions that are orthogonal to each other, and therefore it is easy to compute the differences between the pressure values detected by pressure sensors 12 which are arbitrarily combined, from among the pressure values detected by the pressure sensors S1 through S4. For example, when computing the X direction component of the directional components within the plane, it is easier to separate the pressure sensors S2 and S4 disposed relatively in the +X direction into one combination and the pressure sensors S1 and S3 disposed relatively in the −X direction into another combination, and select the sensors, as compared to a case where the plurality of pressure sensors 12 are arbitrarily disposed in a plurality of directions. Accordingly, external pressures can be detected efficiently.

According to this configuration, the pressure component separation mechanism, which corresponds to the unit detection regions S, is disposed in matrix form, and thus the distributions of the direction and intensity of the external pressures acting on the detection unit 1 can be detected. In addition, the intensity and direction of the total of the external pressures acting on the detection unit 1, as well as the rotational torque, can be detected through the second computation process that computes the direction and intensity of the resultant force of the pressures detected by the detection unit 1 and the third computation process that computes the direction and intensity of the rotational torque accompanying the external pressure.

Although this embodiment describes an example in which a total of four pressure sensors 12 are disposed per unit detection region S, with two rows in the depth direction and two columns in the width direction, it should be noted that the invention is not limited thereto. Any number can be employed as long as there are three or more pressure sensors 12 disposed per unit detection region S.

Second Embodiment

Figure 10:
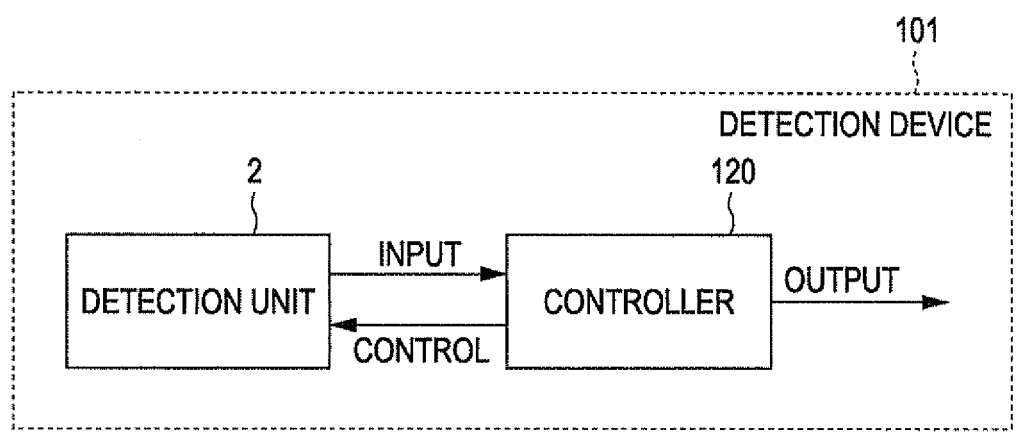
FIG. 10 is a schematic diagram illustrating the overall configuration of a detection device according to a second embodiment.

FIG. 10 is a block diagram illustrating the configuration of a detection device 101 according to a second embodiment of the invention. As in the first embodiment, the detection device 101 according to the second embodiment includes: a detection unit 2 that detects an external pressure applied to a plurality of pressure sensors 112; and a controller 120 that carries out detection operations for detecting the presence/absence of an external pressure based on pressure values detected by at least one of the plurality of pressure sensors 112 and controls the next detection operations carried out by the detection unit 2 based on the results of the stated detection operations.

Figure 11:
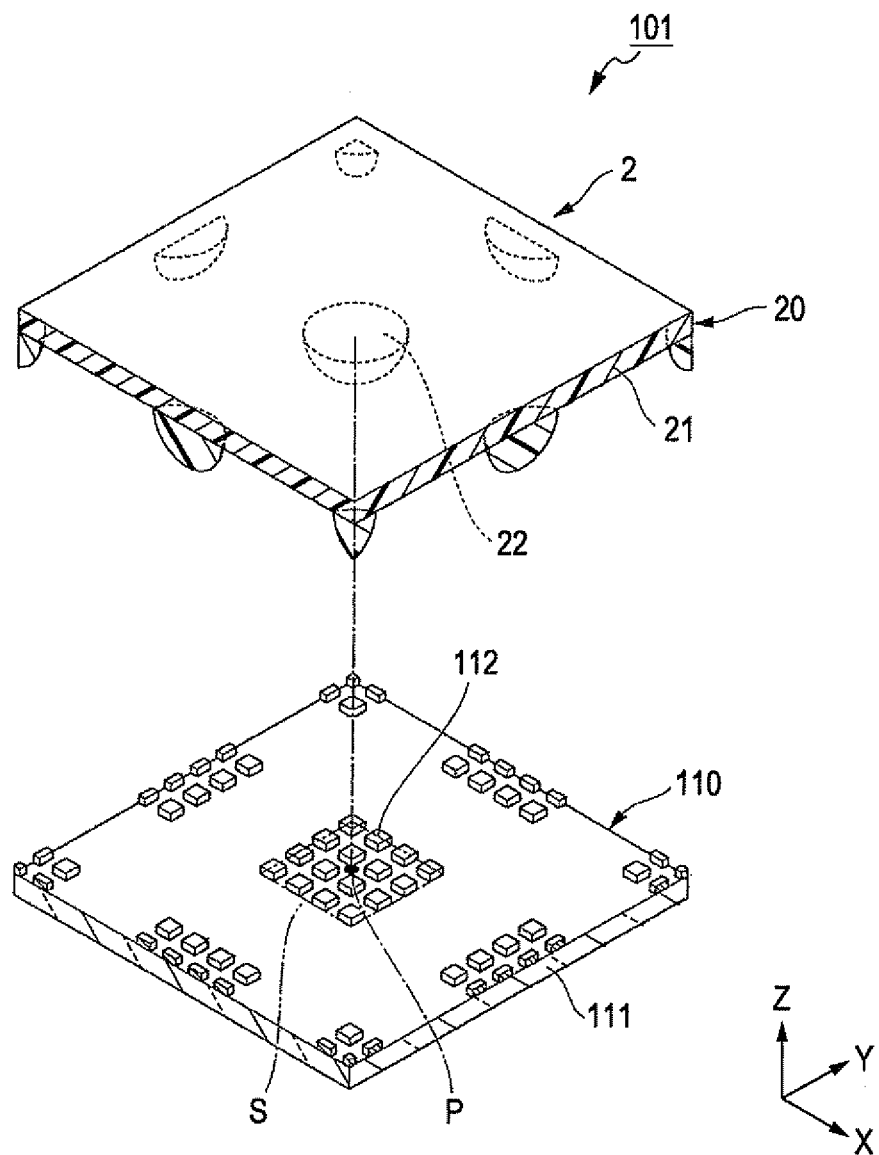
FIG. 11 is an exploded perspective view illustrating the overall configuration of a detection unit according to the second embodiment.

FIG. 11 is an exploded perspective view, corresponding to FIG. 2, illustrating the overall configuration of the detection unit 2 according to the second embodiment. In FIG. 11, elements identical to those in FIG. 2 are given identical reference numerals, and detailed descriptions thereof will be omitted. In FIG. 11, the reference symbol P indicates a reference point, whereas the reference symbol S indicates a unit detection region on which a plurality of pressure sensors 112 disposed in correspondence to a single elastic projection 22 carry out detection.

The detection unit 2 according to this embodiment differs from the detection unit 1 described in the aforementioned first embodiment in that the plurality of pressure sensors 112 are disposed in two directions that are orthogonal to each other (the X direction and the Y direction), with at least four rows in the depth direction and four columns in the width direction. In FIG. 11, the plurality of pressure sensors 112 are illustrated as being disposed with four rows in the depth direction and four columns in the width direction per unit detection region S for the sake of simplicity; however, it should be noted that in reality, the plurality of pressure sensors 112 may be disposed with more than four rows in the depth direction and four columns in the width direction per unit detection region S, as shown in FIGS. 12A through 13C.

The detection unit 2 includes: a first substrate 110 that has the plurality of pressure sensors 112 disposed around the reference point P; and the second substrate 20 in which the elastic projection 22, which is disposed with its center in a position overlapping with the position of the reference point P and which experiences elastic deformation when its tip makes contact with the first substrate 110 due to an external pressure, is formed.

The plurality of pressure sensors 112 are disposed in two directions that are orthogonal to each other (the X direction and the Y direction), with a total of at least 16 sensors disposed with four rows in the depth direction and four columns in the width direction. Specifically, a total of 16 pressure sensors 112, or four rows in the depth direction and four columns in the width direction, are disposed per unit detection region S. The center portion of the 16 pressure sensors 112 (that is, the center portion of the unit detection region S) corresponds to the reference point P.

The controller 120 carries out detection operations for detecting the presence/absence of an external pressure based on pressure values detected by the four pressure sensors 112 that are closest to the reference point P, from among the plurality of pressure sensors 112 disposed around the reference point P, and determines the next detection operations of the pressure sensors 112 in the corresponding unit detection region based on the results of the stated detection operations.

The controller 120 includes the computation unit 123 that carries out a first computation process, computing the difference between the pressure values detected by a arbitrary combination of pressure sensors 112 from among the pressure values detected by the plurality of pressure sensors 112 when the elastic projection 22 has elastically deformed due to an external pressure, and computing the direction and intensity of the external pressure based on that difference.

In addition, the computation unit 123 carries out a second computation process, computing the direction and the intensity of the resultant force of the pressures detected by the detection unit 2, and a third computation process, computing the direction and intensity of the rotational torque acting on the detection unit 2 due to the external pressure. These computation methods are the same as in the first embodiment.

The flow of the detection control operations performed by the detection device 101 is also the same as in the first embodiment. The controller 120 carries out detection operations for detecting the presence/absence of an external pressure based on pressure values detected by the four pressure sensors 112 that are closest to the reference point, from among the plurality of pressure sensors 112 disposed around the reference point P, and determines the next detection operations of the pressure sensors 112 in the corresponding unit detection region S based on the results of the stated detection operations.

In the case where it has been determined that there is no external pressure, the detection operations for quickly detecting the presence/absence of an external pressure based on the pressure values detected by the four pressure sensors 112 closest to the reference point are continued. However, in the case where it has been determined that there is an external pressure, the respective pressure values of the plurality of pressure sensors 112 disposed in the pressure component separation mechanism in the corresponding unit detection regions S are detected, and the direction and intensity of the external pressure is computed. After the series of computations has ended, the results thereof are outputted, and the procedure returns to the detection operations for detecting the presence/absence of an external pressure.

Figure 12A:
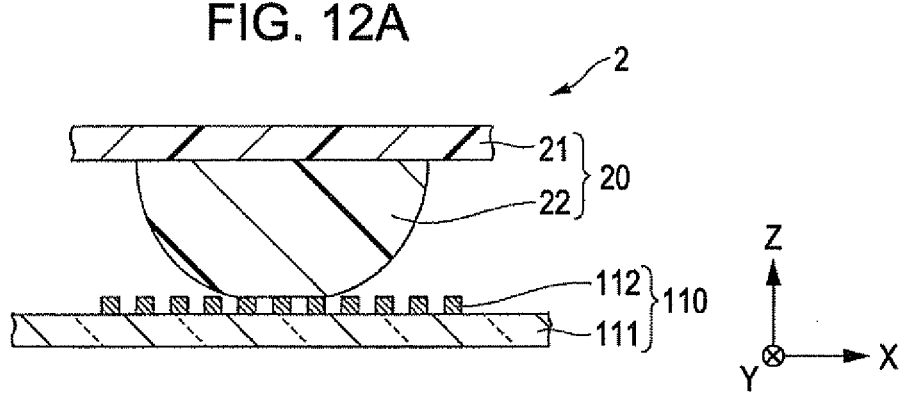
FIGS. 12A through 12C are cross-sectional views illustrating changes in a pressure component separation mechanism in a unit detection region of the detection unit according to the second embodiment.
Figure 12B:
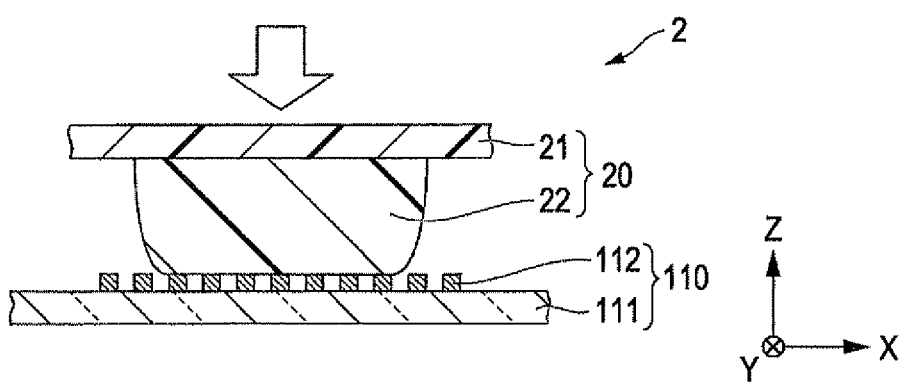
Figure 12C:
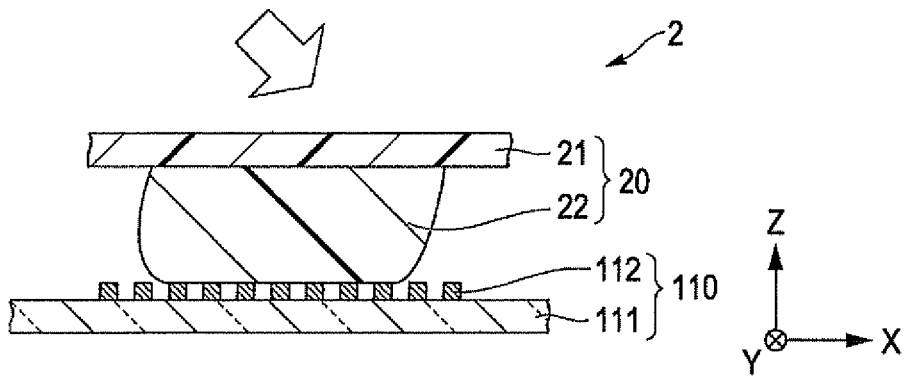
Figure 13A:
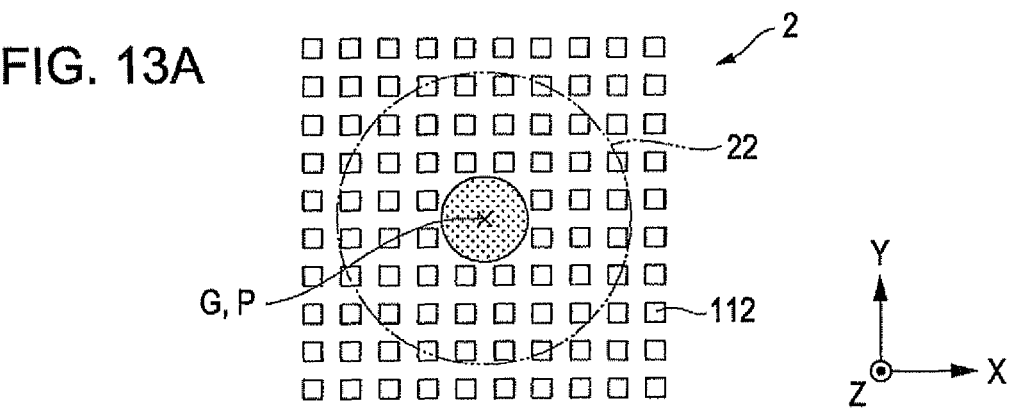
FIGS. 13A through 13C are plan views illustrating changes in the pressure component separation mechanism within a unit detection region of the detection unit according to the second embodiment.
Figure 13B:
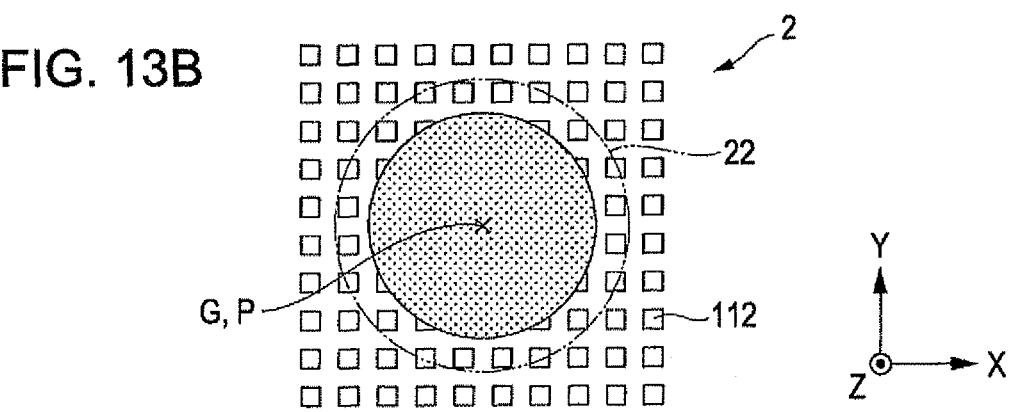
Figure 13C:
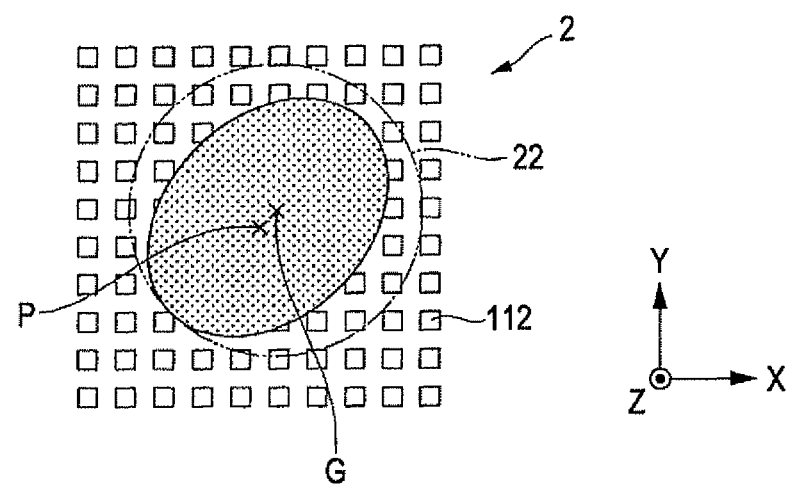

FIGS. 12A through 12C are cross-sectional views, respectively corresponding to FIGS. 5A through 5C, illustrating changes in the pressure component separation mechanism in the unit detection region S according to the second embodiment. FIGS. 13A through 13C, meanwhile, are plan views, respectively corresponding to FIGS. 6A through 6C, illustrating changes in the pressure component separation mechanism in the unit detection region S according to the second embodiment.

Note that FIG. 12A and FIG. 13A illustrate a state prior to an external pressure being applied to the surface of the second substrate 20 (that is, a state where there is no external pressure acting). FIG. 12B and FIG. 13B, meanwhile, illustrate a state in which an external pressure in the vertical direction is applied to the surface of the second substrate 20. FIG. 12C and FIG. 13C illustrate a state in which an external pressure in a diagonal direction is applied to the surface of the second substrate 20. Meanwhile, in FIGS. 13A through 13C, the reference symbol G indicates the center of the elastic projection 22. In FIGS. 12A through 12C and 13A through 13C, elements identical to those in FIGS. 5A through 5C and 6A through 6C are given identical reference numerals, and detailed descriptions thereof will be omitted.

As shown in FIG. 12A and FIG. 13A, the elastic projection 22 does not deform before an external pressure is applied to the surface of the second substrate 20. Accordingly, the distance between the first substrate 110 and the second substrate 20 is kept constant. At this time, the elastic projection 22 is disposed in a position where the center G thereof overlaps with the reference point P. The pressure values of the respective pressure sensors 112 at this time are stored in the data memory 124. The direction and intensity in which the external pressure is acting are found using the pressure values of the pressure sensors 112 stored in the data memory 124 as a reference.

As shown in FIG. 12B and FIG. 13B, when an external pressure in the vertical direction is applied to the surface of the second substrate 20, the elastic projection 22 is compressed and deforms in the Z direction in a state in which the tip of the elastic projection 22 makes contact with the plurality of pressure sensors 112 disposed on the surface of the first substrate 110. Accordingly, the second substrate 20 bends in the −Z direction, and the distance between the first substrate 110 and the second substrate 20 decreases compared to when the external pressure is not acting. The pressure values detected by the pressure sensors 112 at this time are greater compared to when the external pressure is not acting. Furthermore, the amount of change thereof is approximately the same value for each of the pressure sensors 112.

As shown in FIG. 12C and FIG. 13C, when an external pressure in a diagonal direction is applied to the surface of the second substrate 20, the elastic projection 22 is compressed and deforms in a tilted manner, in a state in which the tip of the elastic projection 22 makes contact with the plurality of pressure sensors 12 disposed on the surface of the first substrate 110.

Accordingly, the second substrate 20 bends in the −Z direction, and the distance between the first substrate 110 and the second substrate 20 decreases compared to when the external pressure is not acting. Meanwhile, the amount by which the second substrate 20 bends is greater in the +X direction component than in the −X direction component. At this time, the center G of the elastic projection 22 shifts in the +X direction and the +Y direction from the reference point P.

In this case, the percentage of the surface area of the tip of the elastic projection 22 that overlaps with the plurality of pressure sensors 112 is greater for the portion of the tip that overlaps with the sensors disposed in the +X direction and the +Y direction than for the portion of the tip that overlaps with the sensors disposed in the −X direction and the −Y direction.

Figure 14:
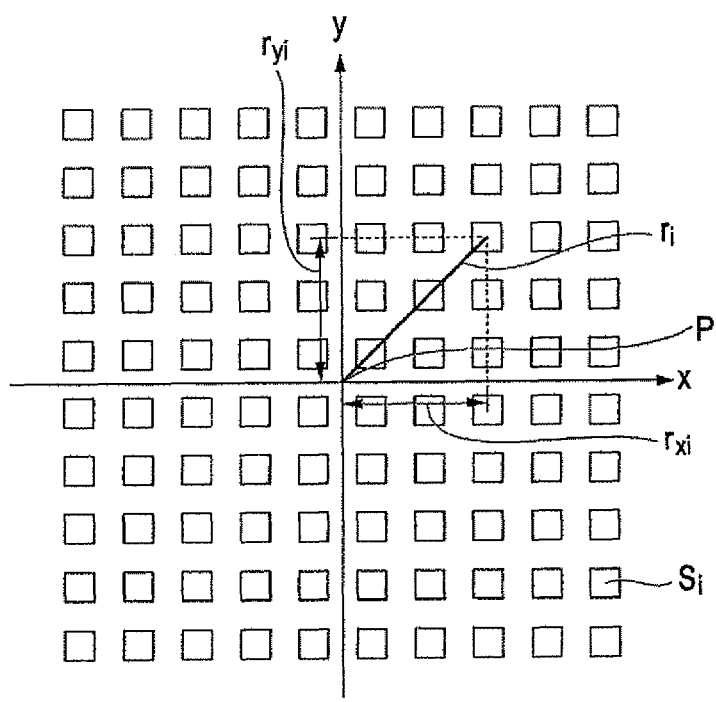
FIG. 14 is a diagram illustrating a coordinate system in a unit detection region of a detection unit according to the second embodiment.

FIG. 14 is a diagram, corresponding to FIG. 7, illustrating a coordinate system in the unit detection region S according to the second embodiment. Note that in FIG. 14, a plurality of pressure sensors $S_i$ (100 sensors) are disposed in matrix form, with 25 each of the pressure sensors $S_i$ being disposed in the region located in the −X direction and the +Y direction, the region located in the +X direction and the +Y direction, the region located in the −X direction and the −Y direction, and the region located in the +X direction and the −Y direction. Furthermore, although 100 pressure sensors $S_i$ are illustrated in FIG. 14 for the sake of simplicity, the number of the pressure sensors $S_i$ that are provided is not limited thereto, and can be altered as desired.

As shown in FIG. 14, a total of 100 pressure sensors $S_i$ are disposed per unit detection region S, with ten rows in the depth direction and ten columns in the width direction. Here, it is assumed that the pressure value detected by each pressure sensor $S_i$ (that is, the detected value) is $P_i$ (where i=1 to 100), and that the directional components within the surface for the distances between the reference point P and the respective pressure sensors $S_i$ are $r_i$ (where i=1 to 100). Furthermore, assuming that the X direction component of the directional components within the surface is $r_{xi}$ (where i=1 to 100) and the Y direction component of the directional components within the surface is $r_{yi}$ (where i=1 to 100), an X direction component $F_x$ of the external force acting in the unit detection region S (that is, the rating amount of the directional component of the external force within the plane that acts in the X direction) is expressed by the following Formula (4).

$$F_x = \frac{\sum_i P_i r_{xi}}{\sum_i P_i} \quad (4)$$

Furthermore, a Y direction component $F_y$ of the external force applied in the unit detection region S (that is, the rating amount of the directional component of the external force within the plane that acts in the Y direction) is expressed by the following Formula (5).

$$F_y = \frac{\sum_i P_i r_{yi}}{\sum_i P_i} \quad (5)$$

Finally, a Z direction component $F_z$ of the external force that acts in the unit detection region S (that is, the vertical direction component of the external force) is expressed by the following Formula (6).

$$F_z = \sum_i P_i \quad (6)$$

In this embodiment, the difference between the pressure values detected by pressure sensors $S_i$ which are arbitrarily combined from among the pressure values detected by the 100 pressure sensors $S_i$ when the elastic projection experiences elastic deformation due to the external pressure is computed, and the direction of the external pressure is computed based on that difference.

As shown in Formula (4), for the X direction component $F_x$ of the external pressure, of the pressure values detected by the 100 pressure sensors $S_i$, the values detected by the pressure sensors $S_i$ disposed relatively in the +X direction are combined, and the values detected by the pressure sensors $S_i$ disposed relatively in the −X direction are combined. In this manner, the X direction component of the external pressure is found based on the difference between the pressure values in the combination of the pressure sensors $S_i$ disposed relatively in the +X direction and the pressure values in the combination of the pressure sensors $S_i$ disposed relatively in the −X direction.

As shown in Formula (5), for the Y direction component $F_y$ of the external pressure, of the pressure values detected by the 100 pressure sensors $S_i$, the values detected by the pressure sensors $S_i$ disposed relatively in the +Y direction are combined, and the values detected by the pressure sensors $S_i$ disposed relatively in the −Y direction are combined. In this manner, the Y direction component of the external pressure is found based on the difference between the pressure values in the combination of the pressure sensors $S_i$ disposed relatively in the +Y direction and the pressure values in the combination of the pressure sensors $S_i$ disposed relatively in the −Y direction.

As shown in Formula (6), for the Z direction component $F_z$ of the external pressure, the resultant force is found by adding together the pressure values of the 100 pressure sensors $S_j$. However, a greater detected value tends to be detected for the Z direction component $F_z$ of the external pressure than for the X direction component $F_x$ of the external pressure and the Y direction component $F_y$ of the external pressure. Accordingly, it is necessary to correct the detected values as appropriate using a correction coefficient determined based on the material, shape, and so on of the elastic projection 22 in order to align the detected value of the Z direction component $F_z$ of the external pressure with the detected values of the X direction component $F_x$ and the Y direction component $F_y$ of the external pressure.

The direction and intensity of the resultant force of the external pressures acting on the detection unit 2 are, as in the first embodiment, obtained by totaling the external pressures acting in the respective unit detection regions S as obtained through the first computation process. Accordingly, the second computation process, which computes the direction and intensity of the total of the external pressures, is a computation that calculates the total of the external pressures obtained in the respective unit detection regions S obtained through the first computation process.

Meanwhile, the direction and intensity of the rotational torque applied to the detection unit 2 is obtained by calculating the coordinates of the center of the distribution of the external pressures applied to the surface of the second substrate 20, and finding the difference between the X direction components or the Y direction components of the external pressures applied in arbitrary unit detection regions that are symmetrical central to the coordinates of the center of the distribution of the external pressures. Accordingly, the third computation process that computes the direction and intensity of the rotational torque is a computation of the difference between the X direction components or the Y direction components of the external force acting on arbitrary unit detection regions S that are symmetrical central to the coordinates of the center of the distribution of the external pressure.

With the detection device 101 according to this embodiment, the presence/absence of an external pressure is detected using only the four pressure sensors 112 that are closest to the reference point P, from among the 100 pressure sensors $S_j$ disposed per unit detection region S, with ten rows in the depth direction and ten columns in the width direction; accordingly, the detection process can be accelerated more than with the detection devices according to JP-A-60-135834 and JP-A-2008-164557.

According to this configuration, the plurality of pressure sensors 112 are disposed in two directions that are orthogonal to each other, with at least four rows in the depth direction and four columns in the width direction, and thus there is a higher number of pressure sensors 112 disposed than in the first embodiment. For this reason, the direction and intensity of the external pressure can be found by calculating the accumulation of the detection results of the pressure sensors 112 based on the pressure values detected by the high number of pressure sensors 112. Accordingly, it is possible to detect the direction and intensity of the external pressure with high precision.

Third Embodiment

Figure 15:
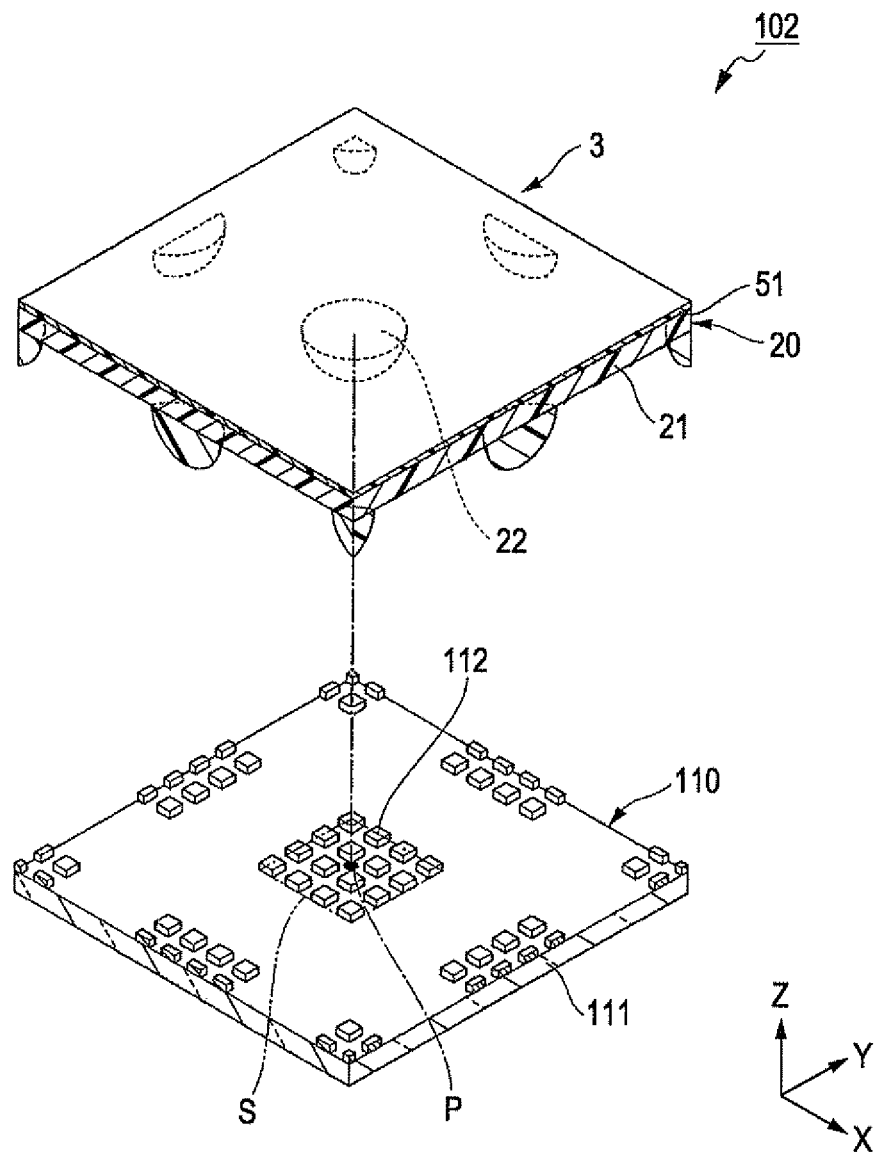
FIG. 15 is an exploded perspective view illustrating the overall configuration of a detection unit according to a third embodiment.

FIG. 15 is an exploded perspective view, corresponding to FIG. 11, illustrating the overall configuration of a detection unit 3 in a detection device 102 according to a third embodiment. In FIG. 15, the reference symbol P indicates a reference point, whereas the reference symbol S indicates a unit detection region on which the plurality of pressure sensors 112 disposed in correspondence to a single elastic projection 22 carry out detection.

The detection device 102 according to this embodiment differs from the detection device 101 described the aforementioned second embodiment in that a reinforcing member 51 that is more rigid than the second main substrate portion 21 is disposed on the surface of the second substrate 20 in the detection unit 3. In FIG. 15, elements identical to those in FIG. 11 are given identical reference numerals, and detailed descriptions thereof will be omitted.

As shown in FIG. 15, the detection unit 3 includes: the first substrate 110 that has the plurality of pressure sensors 112 disposed around the reference point P; the second substrate 20 in which the elastic projection 22, which is disposed with its center in a position that overlaps with the position of the reference point P and which experiences elastic deformation when its tip makes contact with the first substrate 110 due to an external pressure, is formed; and the reinforcing member 51, which is disposed on the opposite side of the second substrate 20 to the side on which the elastic projection 22 is disposed.

The reinforcing member 51 is rectangular, and is formed so as to have the same size as the second main substrate portion 21 when viewed from above. The reinforcing member 51 is more rigid than the second main substrate portion 21. For example, in the case where the material of the second main substrate portion 21 is, like the material of the elastic projection 22, a urethane foam resin (with a durometer hardness of approximately 30), an epoxy resin, a urethane resin, or the like (with a durometer hardness of approximately 60) can be used as the material of which the reinforcing member 51 is formed. Accordingly, an external pressure can be detected accurately even in the case where an external force has been applied by an object that is smaller than the interval at which the elastic projections 22 are disposed on the contact surface, which is the surface of the reinforcing member 51 (for example, a sharp-tipped stylus).

Figure 16A:
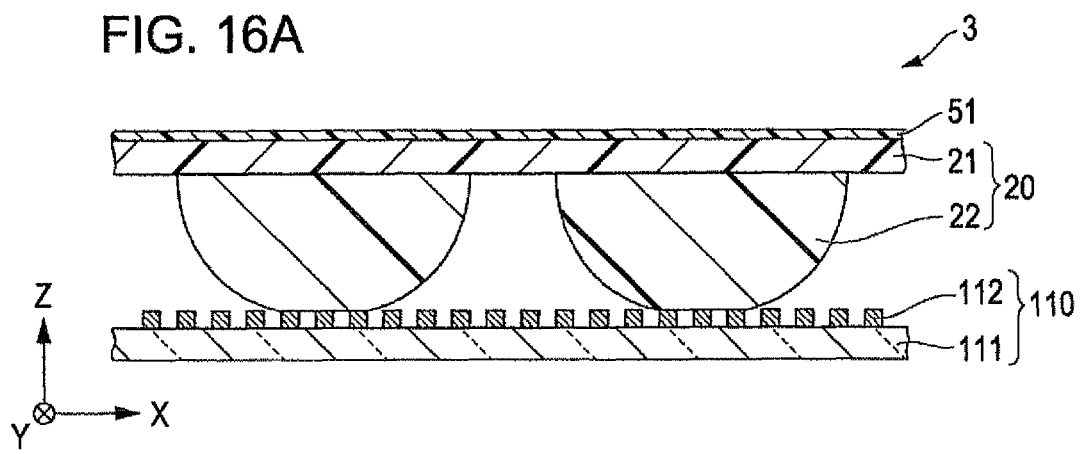
FIGS. 16A through 16C are cross-sectional views illustrating changes in a pressure component separation mechanism within a unit detection region of the detection unit according to the third embodiment.
Figure 16B:
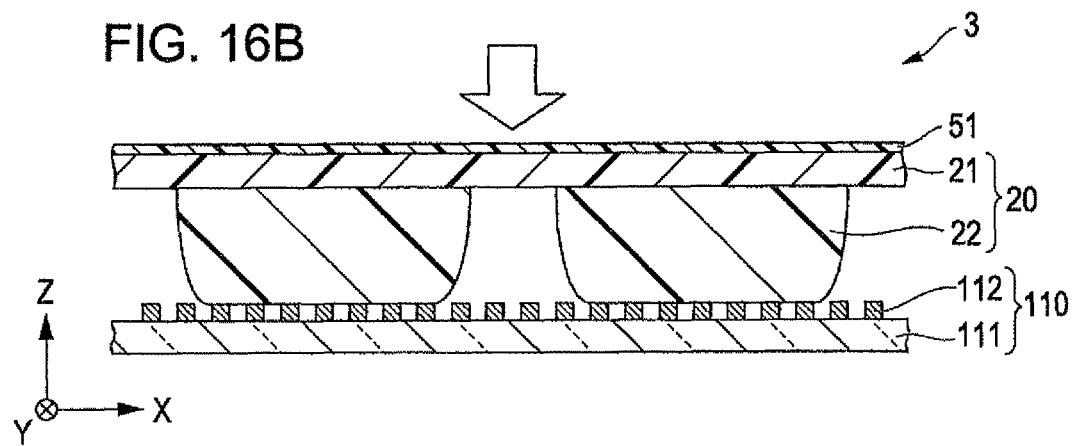
Figure 16C:
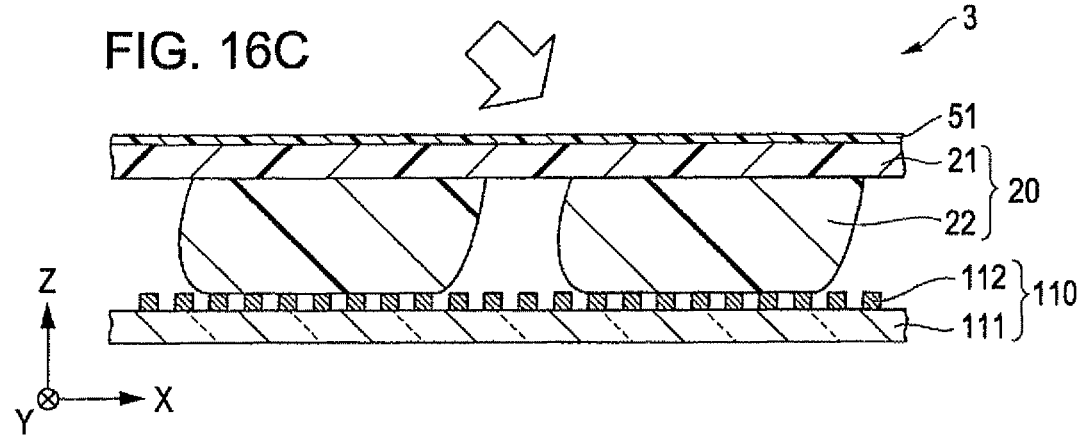

FIGS. 16A through 16C are cross-sectional views, respectively corresponding to FIGS. 12A through 12C, illustrating changes in the pressure component separation mechanism in the unit detection region S according to the third embodiment.

Note that FIG. 16A illustrates a state prior to an external pressure being applied to the surface of the second substrate 20 (the surface of the reinforcing member 51) (that is, a state where there is no external pressure acting). FIG. 16B, meanwhile, illustrates a state in which an external pressure in the vertical direction is applied to the surface of the second substrate 20. FIG. 16C illustrates a state in which an external pressure in a diagonal direction is applied to the surface of the second substrate 20. In FIGS. 16A through 16C, elements identical to those in FIGS. 12A through 12C are given identical reference numerals, and detailed descriptions thereof will be omitted.

As shown in FIG. 16A, the elastic projection 22 does not deform before an external pressure is applied to the surface of the second substrate 20. Accordingly, the distance between the first substrate 110 and the second substrate 20 is kept constant. The pressure values detected by the respective pressure sensors 112 at this time are stored in the data memory 124. The direction and intensity in which the external pressure is acting are found using the pressure values of the pressure sensors 112 stored in the data memory 124 as a reference.

As shown in FIG. 16B, when an external pressure in the vertical direction is applied to the surface of the second substrate 20, the elastic projection 22 is compressed and deforms in the Z direction in a state in which the tip of the elastic projection 22 makes contact with the surface of the second substrate 20. Accordingly, the second substrate 20 bends in the −Z direction, and the distance between the first substrate 110 and the second substrate 20 decreases compared to when the external pressure is not acting. The pressure values detected by the pressure sensors 112 at this time are greater compared to when the external pressure is not acting.

The external pressure also acts in regions between two adjacent elastic projections 22. However, because the reinforcing member 51, which is more rigid than the second main substrate portion 21, is disposed on the surface of the second substrate 20 in this embodiment, in the case where, for example, the detection unit 3 has been pressed in the vertical direction with a finger, the two adjacent elastic projections 22 both are compressed and deform in the vertical direction. Accordingly, it is possible to suppress the two adjacent elastic projections 22 from being compressed and deforming in directions opposite to each other due to the external force, as compared to the case where the reinforcing member 51 is not provided.

As shown in FIG. 16C, when an external pressure in a diagonal direction is applied to the surface of the second substrate 20, the elastic projection 22 is compressed and deforms in a tilted manner, in a state in which the tip of the elastic projection 22 makes contact with the surface of the second substrate 20. Accordingly, the second substrate 20 bends in the −Z direction, and the distance between the first substrate 110 and the second substrate 20 decreases compared to when the external pressure is not acting. Meanwhile, the amount by which the second substrate 20 bends is greater in the +X direction component than in the −X direction component. At this time, the center G of the elastic projection 22 shifts in the +X direction and the +Y direction from the reference point P.

The external pressure also acts in regions between two adjacent elastic projections 22. However, because the reinforcing member 51, which is more rigid than the second main substrate portion 21, is disposed on the surface of the second substrate 20 in this embodiment, in the case where, for example, the detection unit 3 has been pressed in a diagonal direction with a finger, the two adjacent elastic projections 22 both are compressed and deform in the diagonal direction. Accordingly, it is possible to suppress the two adjacent elastic projections 22 from being compressed and deforming in directions opposite to each other due to the external force, as compared to the case where the reinforcing member 51 is not provided.

With the detection device 102 according to this embodiment, the reinforcing member 51, which is more rigid than the second main substrate portion 21, is disposed in the detection unit 3 on the opposite side of the second substrate 20 to the side on which the elastic projection 22 is disposed, and thus the direction of an external pressure can be detected with higher precision. For example, in the case where the external pressure acts in a region between two adjacent elastic projections 22, it is possible to suppress the two adjacent elastic projections 22 from being compressed and deforming in directions opposite to each other, as compared to the case where the reinforcing member 51 is not provided. In other words, it is possible to suppress mistaken detections in which the direction opposite to the direction of the external pressure is detected. Accordingly, it is possible to detect the direction and intensity of the external pressure with high precision.

Although the reinforcing member 51 is disposed on the surface of the second substrate 20 in this embodiment, the invention is not limited thereto. For example, rather than providing the reinforcing member 51, the second main substrate portion 21 itself may be formed of a material that is more rigid than the elastic projections 22. This makes it possible to achieve a thinner size for the device, as compared to the case where the reinforcing member 51 is provided.

Fourth Embodiment

Electronic Apparatuses

Figure 17:
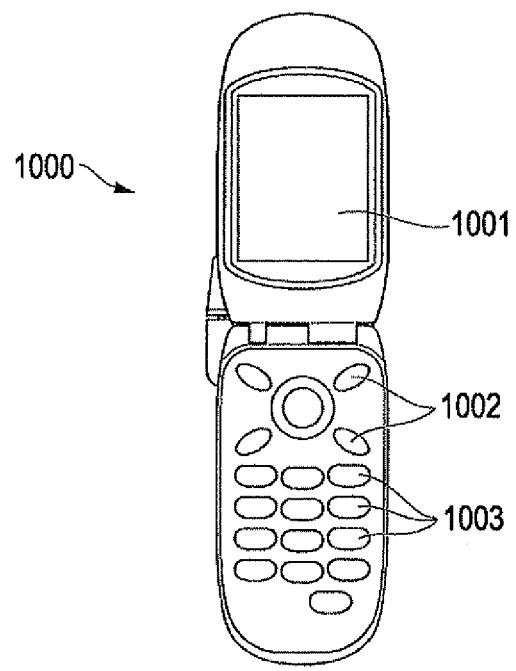
FIG. 17 is a schematic diagram illustrating the overall configuration of a mobile telephone serving as an example of an electronic apparatus.

FIG. 17 is a schematic diagram illustrating the overall configuration of a mobile telephone 1000 in which one of the detection devices 100, 101, and 102 according to the aforementioned embodiments has been applied. The mobile telephone 1000 includes a plurality of operation buttons 1003, a control pad 1002, and a liquid-crystal panel 1001 serving as a display unit. Meprojectionuttons (not shown) are displayed in the liquid-crystal panel 1001 by operating the control pad 1002. For example, when the control pad 1002 is pushed firmly in a state in which a cursor (not shown) has been aligned with a meprojectionutton, a contact list is displayed, the telephone number of the mobile telephone 1000 is displayed, and so on.

Figure 18:
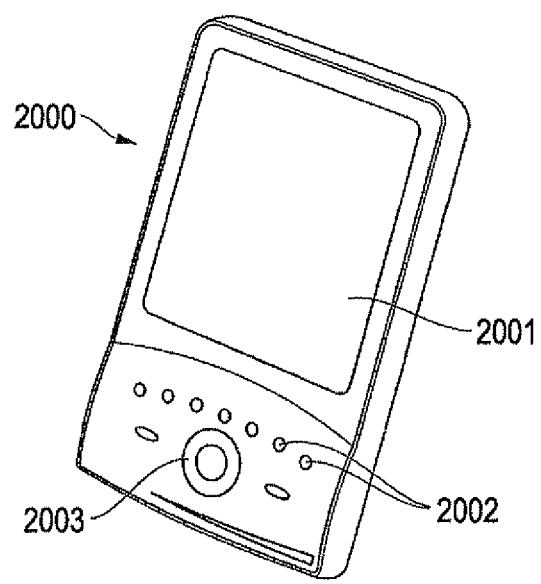
FIG. 18 is a schematic diagram illustrating the overall configuration of a personal digital assistant serving as an example of an electronic apparatus.

FIG. 18 is a schematic diagram illustrating the overall configuration of a personal digital assistant (PDA) 2000 in which one of the detection devices 100, 101, and 102 according to the aforementioned embodiments has been applied. The personal digital assistant 2000 includes a plurality of operation buttons 2002, a control pad 2003, and a liquid-crystal panel 2001 serving as a display unit. A menu displayed in the liquid-crystal panel 2001 can be operated by manipulating the control pad 2003. For example, by firmly pressing the control pad 2003 in a state in which a cursor (not shown) is aligned with a menu (not shown), address records can be displayed, a schedule can be displayed, and so on.

According to such electronic apparatuses, one of the aforementioned detection devices 100, 101, and 102 is included in the control pads 1002 and 2003, and it is thus possible to provide electronic apparatuses capable of detecting the direction and intensity of an external pressure with high precision.

It should be noted that the following apparatuses can also be given as examples of electronic apparatuses: personal computers; video camera monitors; car navigation systems; pagers; electronic notepads; calculators; word processors; workstations; videophones; POS terminals; digital still cameras; apparatuses that include touch panels, and so on. The detection devices according to the invention can be applied to these electronic apparatuses as well.

Fifth Embodiment

Robot

Figure 19A:
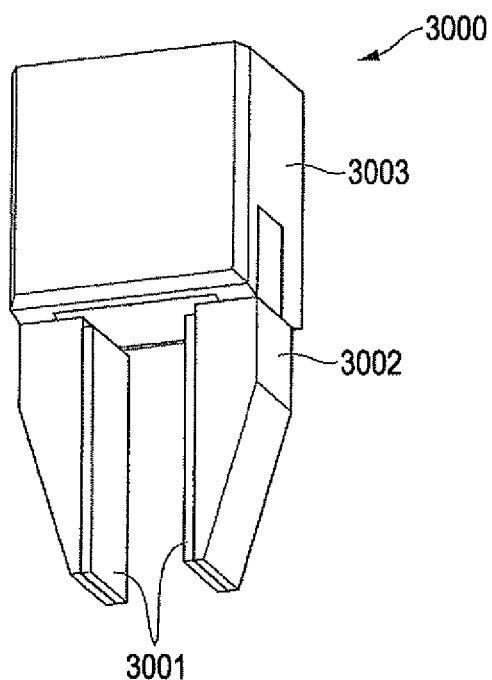
FIGS. 19A and 19B are schematic diagrams illustrating the overall configuration of a robot hand serving as an example of a robot.
Figure 19B:
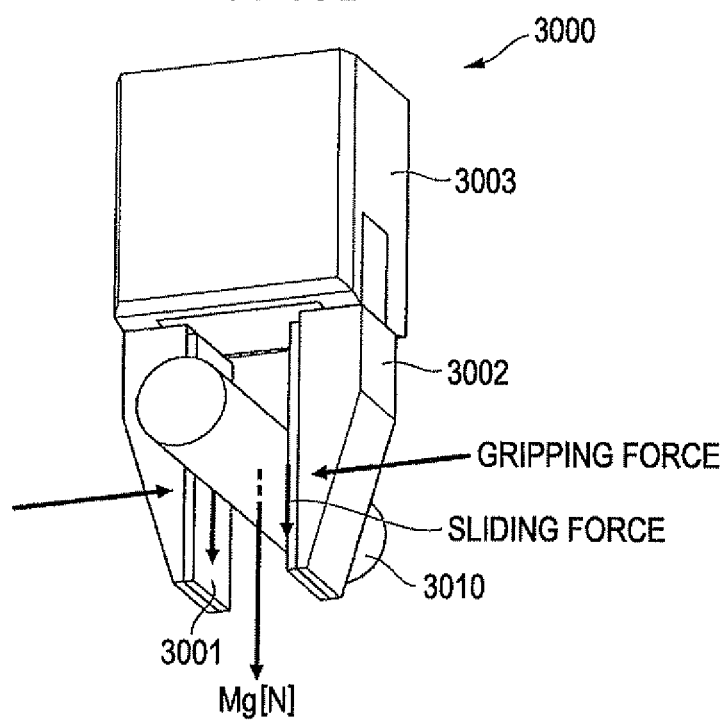

FIGS. 19A and 19B are schematic diagrams illustrating the overall configuration of a robot hand 3000 in which one of the detection devices 100, 101, and 102 according to the aforementioned embodiments has been applied. As shown in FIG. 19A, the robot hand 3000 includes a main body portion 3003 and a pair of arm portions 3002, as well as gripping portions 3001 in which one of the detection devices 100, 101, and 102 has been applied. Note that the arm portions 3002 open and close when a driving signal has been sent to the arm portions 3002 by a control device such as a remote controller.

A case in which an object 3010 such as a cup is gripped by the robot hand 3000 will be considered, as shown in FIG. 19B. Here, the force acting on the object 3010 is detected as pressure by the gripping portions 3001. Because the robot hand 3000 includes one of the stated detection devices 100, 101, and 102 as the gripping portions 3001, the robot hand 3000 can detect forces in the direction perpendicular to the surface of the object 3010 (the contact surface) along with the force in which the object 3010 slides under gravity Mg (that is, the sliding force component), rotational torque, and so on. For example, the robot hand 3000 can hold the object 3010 with a reduced force in accordance with the qualities of the object 3010, so as not to cause soft objects to deform, drop slippery objects, and so on.

According to such a robot, one of the aforementioned detection devices 100, 101, and 102 is provided, and it is thus possible to provide a robot capable of detecting the direction and intensity of an external pressure with high precision.

This application claims priority to Japan Patent Application No. 2010-210516 filed Sep. 21, 2010, the entire disclosures of which are hereby incorporated by reference in their entireties.

What is claimed is:

1. A detection device comprising:
a first substrate on which a plurality of pressure sensors are disposed;
a detection unit that detects an applied external force using the plurality of pressure sensors; and
a controller that performs a first detection operation for detecting a presence/absence of the external force based on whether pressure values detected by at least one of the plurality of pressure sensors exceed a threshold, the at least one of the plurality of pressure sensors including pressure sensors that are disposed in a position that is the closest to the reference point, and controls a second detection operation of the detection unit based on whether the threshold is exceeded in the first detection operation, the second detection operation using a greater number of pressure sensors than used in the first detection operation.

2. The detection device according to claim 1, the plurality of pressure sensors being disposed around a reference point on the first substrate;
the detection device further comprising a second substrate on which is formed an elastic projection disposed so as to oppose the plurality of pressure sensors on the first substrate and whose tip makes contact with a position on the first substrate that overlaps with the reference point;
the detection unit including a pressure component separation mechanism configured of the plurality of pressure sensors and the elastic projection; and
the reference point referring to a point within the plane in which the center of the elastic projection is located when a sliding force is not acting.

3. The detection device according to claim 2, further comprising a computation unit that carries out a first computation process in which a difference between pressure values detected by arbitrary combination of pressure sensors among the plurality of pressure sensors arising due to the elastic projection of the pressure component separation mechanism elastically deforming is computed, and a direction and intensity of the applied external force is computed based on the difference.

4. The detection device according to claim 2, wherein the plurality of pressure sensors are disposed symmetrically, with the reference point serving as the point of symmetry.

5. The detection device according to claim 4, wherein the plurality of pressure sensors are disposed in matrix form in two directions that are orthogonal to each other.

6. The detection device according to claim 2,
wherein a plurality of elastic projections are formed on the second substrate; and
the detection unit includes a plurality of pressure component separation mechanisms between the first substrate and the second substrate.

7. The detection device according to claim 3, wherein the computation unit carries out a second computation process that computes the direction and intensity of the total of the external forces applied to the second substrate using the result of the first computation process.

8. The detection device according to claim 3, wherein the computation unit carries out a third computation process that computes the direction and intensity of rotational torque applied to the second substrate due to the external force using the result of the first computation process.

9. The detection device according to claim 2, wherein a reinforcing member that is more rigid than the second substrate is disposed on the opposite side of the second substrate to the side on which the elastic projections are formed.

10. An electronic apparatus comprising the detection device according to claim 1.

11. A robot comprising the detection device according to claim 1.

12. A detection device that detects a direction of an external force applied to a measurement surface of a substrate,
wherein the substrate includes:
a first substrate that includes a plurality of pressure sensors disposed around a reference point; and
a second substrate on which is disposed an elastic projection whose center is positioned in a position that overlaps with the reference point and that elastically deforms due to the external force in a state in which the tip of the elastic projection makes contact with the pressure sensors,
the detection device comprising:
a first detection unit that detects pressure values from at least one of the plurality of pressure sensors, the at least one of the plurality of pressure sensors including pressure sensors that are disposed in a position that is the closest to the reference point;
a determination unit that determines the presence/absence of the external force based on whether the detected pressure values exceed a threshold; and
a second detection unit that, when the determination unit has determined that the threshold is exceeded and the external force is present, detects the direction of the external force from all of the plurality of pressure sensors using a greater number of pressure sensors than used by the first detection unit.

13. The detection device according to claim 12,
wherein the first substrate includes a plurality of unit detection regions, each configured of the plurality of pressure sensors disposed around the reference point;
the first detection unit detects a presence/absence of the external force in all of the plurality of unit detection regions; and
when the determination unit has detected the presence of the external force, the second detection unit selects only the unit detection region in which the external force has been detected, and detects the direction of the external force from the plurality of pressure sensors in the selected unit detection region.

14. An electronic apparatus comprising the detection device according to claim 12.

15. A detection method for detecting an external force using a plurality of pressure sensors disposed upon a substrate, the plurality of pressure sensors being disposed around a reference point on the substrate, the method comprising:

detecting pressure values from at least one of the plurality of pressure sensors, the at least one of the plurality of pressure sensors including pressure sensors are disposed in a position that is the closest to the reference point;

determining a presence/absence of the external force based on whether the detected pressure values from the at least one of the pressure sensors exceed a threshold; and detecting a direction of the external force from all of the plurality of pressure sensors when it has been determined that the threshold is exceeded and the external force is present using a greater number of pressure sensors than used in the step of detecting the pressure values.

16. A detection method for detecting a direction of an external force using a detection device, the detection device including a first substrate that includes a plurality of pressure sensors disposed around a reference point and a second substrate on which is disposed an elastic projection whose center is positioned in a position that overlaps with the reference point and that elastically deforms due to the external force in a state in which the tip of the elastic projection makes contact with the pressure sensors, and the method comprising:

detecting pressure values from at least one of the plurality of pressure sensors, the at least one of the plurality of pressure sensors including pressure sensors that are disposed in a position that is the closest to the reference point;

determining a presence/absence of the external force based on whether the detected pressure values from the at least one of the pressure sensors exceed a threshold;

detecting pressure values from all of the plurality of pressure sensors when where it has been determined that the threshold is exceeded and the external force is present; and detecting the direction of the external force based on the pressure values from all of the pressure sensors using a greater number of pressure sensors than used in the step of detecting the pressure values from at least one of the plurality of pressure sensors.

17. The detection method according to claim 16, further comprising repeating the detection of the pressure values from the at least one of the pressure sensors until it has been determined that the external force is present.

18. The detection method according to claim 16, wherein the first substrate includes a plurality of unit detection regions, each configured of the plurality of pressure sensors;

the detecting of the pressure values from the at least one of the pressure sensors includes detecting the external force from all of the plurality of unit detection regions; and the detecting of the pressure values from all of the pressure sensors further includes selecting only the unit detection region in which the external force has been detected among the plurality of unit detection regions, and detecting the direction of the external force from the plurality of pressure sensors in the selected unit detection region.

19. A detection method for detecting an external force using plurality of pressure sensors disposed upon a substrate, the plurality of pressure sensors being disposed around a reference point on the substrate, the method comprising:

detecting a pressure from pressure sensors of the plurality of pressure sensors;

determining a presence/absence of the external force based on whether the detected pressure from the pressure sensors disposed closest to the reference point exceeds a threshold; and detecting a direction of the external force based on pressure values detected by the pressure sensors when it has been determined that the external force is present, wherein the number of pressure sensors used in detecting the presence/absence of the external force is less than the number of pressure sensors used in the detection of the direction of the external force.

* * * * *